(12) United States Patent
Kikuchi et al.

(10) Patent No.: US 6,532,320 B1
(45) Date of Patent: Mar. 11, 2003

(54) EQUIPMENTS, TRANSPONDOR AND METHODS FOR OPTICAL FIBER TRANSMISSION

(75) Inventors: Nobuhiko Kikuchi, Tokyo (JP); Shinya Sasaki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 09/660,493

(22) Filed: Sep. 12, 2000

(30) Foreign Application Priority Data

Feb. 17, 2000 (JP) ........................................ 2000-045162

(51) Int. Cl.[7] ................................................ G02B 6/28
(52) U.S. Cl. ............................ 385/24; 385/15; 359/133
(58) Field of Search ...................... 385/15, 24; 359/127, 359/128, 130, 124, 125, 126, 129, 131, 132, 133, 134

(56) References Cited

U.S. PATENT DOCUMENTS

| | | | | |
|---|---|---|---|---|
| 5,550,818 A | * | 8/1996 | Brackett et al. | 370/60 |
| 5,710,650 A | * | 1/1998 | Dugan | 359/133 |
| 5,999,291 A | * | 12/1999 | Anderson | 359/133 |
| 6,046,833 A | * | 4/2000 | Sharma et al. | 359/119 |
| 6,081,359 A | * | 6/2000 | Takehana et al. | 359/133 |

* cited by examiner

*Primary Examiner*—John D. Lee
*Assistant Examiner*—Jennifer Doan
(74) *Attorney, Agent, or Firm*—Antonelli, Terry, Stout & Kraus, LLP

(57) ABSTRACT

The technical problem disclosed concerns increase of transmission distance between inter-site transmission parts when a circuit speed is increased, and simplification of an intra-site circuit. The means to resolve the problem is as follows. An intra-site circuit connecting an intra-site information communications device 140-1 and a wavelength division multiplexing optical transmission device 147 is demultiplexed into plural low speed wavelength division multiplexing signals by a transponder 100 according to this invention, and transmitted to an inter-site optical fiber circuit 144. The signals are again multiplexed into a high-speed optical signal by a transponder 110 in a wavelength division multiplexing optical transmission device 148 on the receiving side, and transmitted to an intra-site optical fiber circuit 143-1.

14 Claims, 14 Drawing Sheets

EQUIPMENTS, TRANSPONDOR AND METHODS FOR OPTICAL FIBER TRANSMISSION

BACKGROUND OF THE INVENTION

1. Field of the Invention

This invention relates to equipment, transponders and methods for optical fiber transmission. Specifically, it relates to a WDM (Wavelength Division Multiplexing) optical fiber transmission device and wavelength division multiplexing system. More specifically, it relates to a wavelength division multiplexing optical fiber transmission system which multiplexes plural optical signals of different wavelength in an optical fiber to transmit information, and to a transponder device or a wavelength division multiplexing optical fiber transmission device using this system.

2. Description of the Related Art

Wavelength division multiplexing (WDM) is an extremely useful technique for increasing the volume of optical fiber communications. A typical example of the construction of a prior art wavelength division multiplexing optical transmission system comprises a wavelength division multiplexing optical transmission device 152 (transmitting side) and a wavelength division multiplexing optical transmission device 153 (receiving side) disposed at sites 141-1, 141-2 located at two points separated by a distance of several kilometers to several thousand kilometers, as shown in FIG. 5. The two devices are connected by inter-site optical fiber circuits 144-1, 144-2, and a wavelength division multiplexing optical repeater 151. The figure shows only transmission from the site 141-1 to the site 141-2, although this is generally combined with a wavelength division multiplexing optical transmission device with reverse direction.

A SONET (Synchronous Optical NETwork)/SDH (Synchronous Digital Hierarchy) terminals, ADM devices, or prior art information communications devices 150-1, 150-2 which perform information communications, such as IP routers, are provided in the transmitting side site 141-1, and optical signals are transmitted to the wavelength division multiplexing transmission device 152 via intra-site optical fiber circuits 142-1–142-n. The intra-site optical fiber circuits 142 have a distance of the order of several m—several tens of kilometers, and uses for example a SONET/SDH signal format such as OC-12 (600 Mbit/s) or OC-48 (2.5 Gbit/s)

From the viewpoint of cost, IM/DD (Intensity Modulation/Direct Detection) of a laser diode operating in, for example, the 1.3 μm wavelength band is used for the optical transceivers in the intra-site optical fiber circuits 142; As the signals transmitted in the intra-site optical fiber circuits have problems of wavelength band, wavelength interval, spectral purity, wavelength accuracy and dispersion tolerance, they are unsuitable for wavelength division multiplexing transmission over long distance optical fibers. Therefore, the signals are converted to plural different wavelengths (λ1–λn) for inter-site wavelength division multiplexed transmission by the transmitting side transponder devices 120-1–120-n, wavelength division-multiplexed by an optical multiplexer 145, and then output to the inter-site optical fiber circuit 144-1.

The wavelength division-multiplexed optical signals transmitted to the inter-site optical fiber circuit 144-1 are relay amplified by the optical repeater 151, transmitted along the inter-site optical fiber circuit 144-2, input to a wavelength division multiplexing optical transmission device 153 on the receiving side, wavelength-demultiplexed into optical signals of wavelength λ1–λn by an optical demultiplexer 146, and then respectively input to receiving side transponder devices 130-1–n.

In the prior art transmission side transponder device 120, an optical signal of wavelength λa is received by an intra-site transmission optical receiver 123 from the intra-site optical fiber 142, and the optical signal is then converted to an inter-site transmission signal format as a wavelength division-multiplexed optical signal (wavelength λ1) by an inter-site transmission optical transmitter 124, and output, as shown in FIG. 6.

The wavelength of the inter-site transmission optical signal is normally in the 1.5 μm band which is suitable for amplification by an optical fiber amplifier, and generally coincides with wavelength grids (50 Ghz, 100 GHz, 200 GHz interval) which are wavelengths standardized for use with WDM. Also, as the inter-site transmission distance may attain several 100–several 1000 km, external optical modulation, which is suitable for long distance transmission, is often used. For the inter-site transmission signal format, a SONET/SDH format basically identical to that used for the intra-site transmission format is widely adopted, but in recent years, a wavelength wrapper with the addition of bit error correction between transponder sections or a monitoring function has also been considered.

In the receiving side transponder device 130, an optical signal input from an inter-site side input fiber 131 is received by an inter-site transmission optical receiver 133, the optical signal is converted to an intra-site circuit signal format or the wavelength λa by an intra-site transmission optical transmitter 134, and output to an intra-site side output optical fiber 132, as shown in FIG. 7. These optical fibers are respectively connected to intra-site information communications devices 150-3, 150-4 via intra-site optical fiber circuits 143-1–143-n in FIG. 5.

In the prior art wavelength multiplexing transmission system, the transmission speeds on the intra-site side and inter-site side are identical in principle. For example, in the case where the transmission speed of the inter-site optical fiber circuits 142, 143 shown in FIG. 3 is 2.5 Gbyte/s, the transmission speed of an optical signal of wavelength λn in the inter-site optical: fiber circuit 144 was also 2.5 Gbyte/s. In this prior art device, if the information transmission amount between the information communications devices 150-2, 150-4 increases and the bit rate is increased, for example, transmission in the inter-site transmission part is difficult. As the maximum transmission distance of optical fiber transmission is inversely proportional to the square of the bit rate, when the transmission speed is as high as 10 Gbit/s or 40 Gbit/s, the maximum transmission distance of the inter-site transmission part very rapidly becomes shorter. For example, the maximum transmission distance at 2.5 Gbit/s is 600–1200 km, but as it is of the order of several tens of km at 10 Gbit/s and no more than several km at 40 Gbit/s, it is difficult to achieve long-distance transmission at these speeds. If a dispersion compensation technique or dispersion shifted fiber (DSF) is used, this value can be improved to some extent, but even then, the usual limit of the transmission distance is around 500 km at 10 Gbit/s and 40 km at 40 Gbit/s. Therefore, if the transmission speed of the intra-site optical fiber circuits 142, 143 is increased, the number of repeaters in the inter-site part must be increased, and the cost increases.

To deal with this problem, the system of FIG. 5 shows an example where the number of inter-site circuits in the information communications device 150-1 is increased to, for example, three. In this example, even if the transmission amount is increased by three times, the transmission speed in the inter-site transmission part remains the same, so the above problem can be avoided. However, the number of intra-site circuits and the number of inter-site transceivers also increases by three times, so there are other problems in that cost and intra-site circuit management difficulties increase.

Further, due to the aforesaid transmission distance problem, the intra-site transmission speed of the wavelength division multiplexing transmission device 152 is normally limited in practice to a value such as 2.5 Gbit/s–10 Gbit/s, and the speed cannot be increased without limit. Therefore, even if a faster intra-site circuit interface such as 10 Gbit/s or 40 Gbit/s were developed, it could not be applied to this wavelength division multiplexing transmission device.

SUMMARY OF THE INVENTION

It is therefore an object of this invention to provide a wavelength division multiplexing system which can transmit information at high speed without increasing the number of intra-site transmission paths which allows lengthening of the inter-site transmission path, to provide a wavelength division multiplexing optical transmission device and transponder used by this system, and to provide an information communications device using this transponder.

To achieve the above object, the wavelength division multiplexing transmission system of this invention comprises a wavelength division multiplexing transmission device connected to an information communications device by an intra-site optical fiber circuit, and a transmitting part and receiving part connected to the aforesaid wavelength division multiplexing transmission device by an inter-site optical fiber circuit. The transmitting part converts a high-speed information signal transmitted by the intra-site optical fiber circuit into plural optical signals of different wavelengths by the transponder device in the wavelength division multiplexing transmission device, and transmits an optical wavelength division multiplexed signal obtained by wavelength multiplexing the aforesaid plural optical signals of different wavelengths to the receiving part by the aforesaid inter-site optical fiber circuit. In the receiving part, the received optical wavelength division multiplexed signal is preferably wavelength-demultiplexed by a wavelength demultiplexer of the wavelength division multiplexing transmission device, the demultiplexed plural optical signals of different wavelengths are multiplexed into one high-speed optical signal by the transponder device, and transmitted to the information communications device of the receiving part by an inter-site optical fiber circuit.

The aforesaid optical transponder device of the transmitting part.comprises an intra-site transmission optical receiver which receives an information signal from the aforesaid intra-site optical fiber circuit, a demultiplexer which time divides the information signal received by the intra-site transmission optical receiver, and plural inter-site transmission optical transmitters which convert the demultiplexed signals respectively into optical signals of different wavelengths.

The aforesaid optical transponder device on the receiving side comprises plural optical receivers which receive the plural optical signals (information signals) of different wavelengths, a multiplexer which multiplexes the aforesaid plural information signals from the optical receiver into one high-speed information signal by time division multiplexing, and an intra-site transmission optical transmitter which connects the multiplexed information signal to an optical fiber circuit.

The aforesaid wavelength division multiplexing transmission device of the transmitter part comprises the transmitting side optical transponder device, and an optical multiplexer which performs optical multiplexing on the optical signals of different wavelengths demultiplexed by the aforesaid transmitting side optical transponder device.

The aforesaid wavelength division multiplexing transmission device of the receiver part comprises an optical demultiplexer which wavelength-demultiplexes the optical wavelength division multiplexed signal input from the inter-site optical fiber circuit, and the aforesaid receiving side optical transponder device which inputs the plural optical signals of different wavelengths demultiplexed by the optical demultiplexer.

In another preferred embodiment of the invention, the wavelength division multiplexing optical transmission device is provided with various functions, for example an optical repeater function, an add-drop function and a switching (routing) function, by combining the aforesaid optical transponder devices or wavelength division multiplexing optical transmission devices in the transmitting and receiving parts. The aforesaid transponder device may also be an intra-site interface device wherein the wavelength division multiplexing transmission device and information communications device are combined.

According to this invention, in the aforesaid wavelength division multiplexing optical transmission system, information signals are processed at high speed by a small number of circuits in the intra-site circuit, and the inter-site transmission path is lengthened and information is transmitted at high speed in the inter-site optical fiber circuit.

Further, the optical transponder device, wavelength division multiplexing optical transmission device and interface device of this invention may be provided, either individually or in combination, with various functions of a wavelength division multiplexing optical transmission system. For example, they may be devices having SONET/SDH/ATM multiplexing, demultiplexing, replacing, switching, fault recovery, bit rate conversion or add-drop functions, or IP packet switching, routing, broadcast or interface conversion functions.

This invention may easily be realized by means of a simple hardware construction if the multiplexing/demultiplexing in the intra-site optical circuit uses time division multiplexing/demultiplexing of information signals having one to plural bits as units, or time division multiplexing/demultiplexing with the addition of a parity signal. A device or system according to this invention having compatibility with prior art SONET/SDH devices may be realized by performing multiplexing/demultiplexing according to the SONET/SDH scheme. Maintenance and reliability of intra-site optical circuits is improved, and practical feasibility is enhanced, by adding an intra-site optical circuit monitoring information signal during multiplexing, and extracting this monitoring information signal during demultiplexing. Device and system reliability are further enhanced by adding an error correction signal before multiplexing, and extracting the error correction signal during demultiplexing.

A routing mechanism or path setting mechanism may be added by incorporating an optical signal or electrical signal switch in the device or system of this invention and changing over the signal path, whereby the application field of the invention is widened. The reliability of the invention may also be greatly improved by providing plural transceivers, reserving some of these as standbys, and switching over to standby transmission if a fault occurs. In particular, when packet information is transmitted, the aforesaid two functions may be simultaneously implemented by providing a packet information routing circuit.

Further, by giving the optical transmitter, the laser light source in the optical transmitter and the optical receiver of this invention modular constructions so that they can be individually replaced if necessary, maintenance is greatly improved even in devices having a large number of components, and the apparatus car be easily constructed. Likewise, even if a wavelength variable laser is used for the light source or the light source is supplied from outside, standby transponder devices and the types of parts used for maintenance and production can be greatly reduced. Finally, if a compensation circuit for differential group delay is provided which compensates for propagation delay lime differences between wavelength division multiplexed, transmitted optical signals, the intra-site optical circuit bandwidth can be used effectively, so the application field of the invention is widened.

These and other, objects, constructions and features of the invention will become apparent from the following embodiments thereof.

DESCRIPTION OF THE PREFERRED EMBODIMENTS

Embodiment 1

Figure 1:
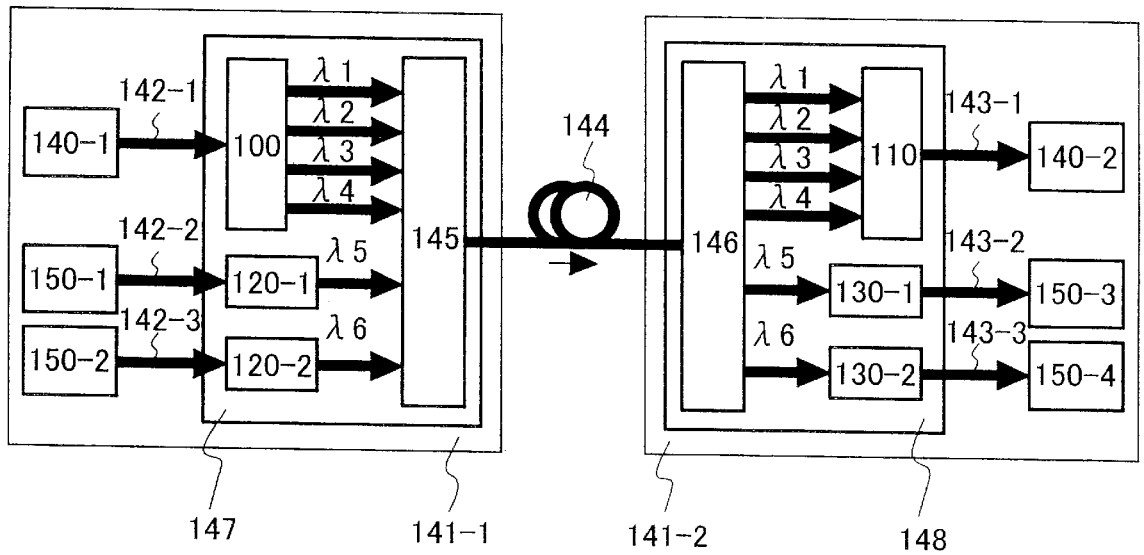
FIG. 1 is a schematic view showing a first embodiment of a wavelength division multiplexing transmission system according to this invention.

FIG. 1 is a schematic view of a first embodiment of a wavelength division multiplexing optical transmission system according to this invention. A wavelength division multiplexing optical transmission device.(transmitting side) 147 and a wavelength division multiplexing optical transmission device (receiving side) 148 are respectively disposed in two sites, (transmitting) 141-1 and (receiving) 141-2.

An information communications device 140-1 sends out an information signal to be transmitted to a transponder device (referred to hereafter as transponder) 100 according to this invention, which is disposed inside the wavelength division multiplexing optical transmission device 147, via an intra-site optical fiber circuit 142-1. In the transponder device 100, the information signal is demultiplexed and converted to four optical signals of mutually different wavelengths λ1–λ4 at a lower speed than the transmission speed of the intra-site fiber circuit 142-1, and converted again to a signal format and wavelength suitable for inter-site transmission.

The optical signal output by the transponder 100 is wavelength division multiplexed by an optical multiplexer 145, and transmitted to an inter-site optical fiber circuit 144. Information signals from information communications devices 150-1, 150-2 are sent to the optical multiplexer 145 via transponders 120-1, 120-2 known in the art, and are wavelength division multiplexed and transmitted to the receiving side site 141-2 by the inter-site optical fiber circuit 144 together with the information signal from the information communications device 140-1 of this invention.

In the receiving side site 141-2, the received wavelength division multiplexed optical signal is demultiplexed into each of the original optical wavelengths by an optical demultiplexer 146. A transponder device 110 according to this invention receives the four optical signals of wavelengths λ1 λ4, multiplexes them again into an optical signal of one time sequence, sends them to an inter-site optical fiber circuit 143-1, and transmits them to an information communications device 140-2. For the sake of simplicity, in FIG. 1, the sites are limited to being a transmitting site or a receiving site, although in practice both sites may have transmitting and receiving functions.

Figure 2:
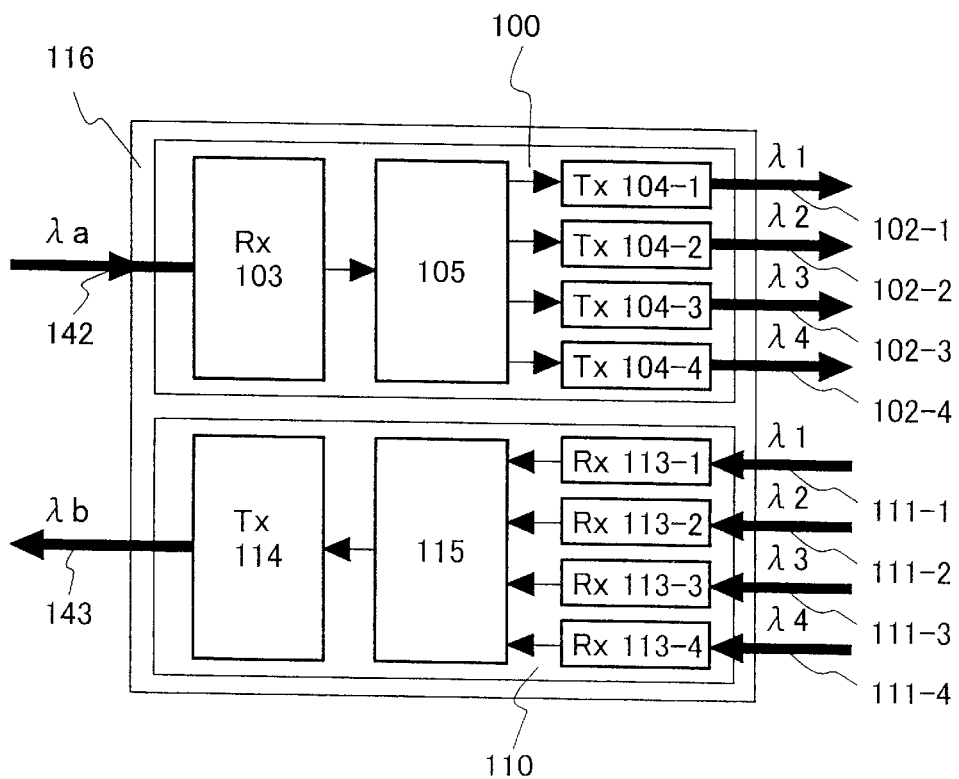
FIG. 2 is a schematic view showing a first embodiment of a transponder according to this invention.

FIG. 2 shows the construction of one embodiment of a transponder 116 according to this invention. In this embodiment, the site comprises both the transponder 100 and 110 of the transmitting part/receiving part. In this figure, the thick arrows show optical fibers and the thin arrows show electrical paths. The same numbers are assigned to parts which are effectively identical to the construction of the diagram described earlier, and a detailed description of them is omitted (same for the following diagrams).

In the transponder 100 of the transmitting part, the optical signal (wavelength λa) input from the intra-site side input fiber 142 is received by an intra-site transmission optical receiver 103, converted to an information signal in an electrical area, and demultiplexed into plural (four in the diagram) information signals via a demultiplexing circuit 105. In the electrical circuit, these information signals are normally transmitted in parallel, but the number of signals is not necessarily the physical number of signal lines and may represent a theoretical number of signal circuits. The demultiplexed information signals are respectively sent to inter-site transmission optical transmitters 104-1–104-4, and after converting to an optical signal format for inter-site transmission and mutually different optical signal wavelengths suitable for wavelength division multiplexing transmission, are output to inter-site side output optical fibers 102-1–102-4.

In the transponder 110 of the receiving part, the optical signals input from inter-site side input optical fibers 111-1–111-4 are respectively received by inter-site transmission optical receivers 113-1–113-4, and after conversion to electrical signals, they are again time division multiplexed into one signal by a multiplexing circuit 115, converted to a high-speed signal of wavelength λa by the intra-site transmission optical receiver 114 and output from an intra-site side output fiber 143.

As the optical demultiplexer 146, any kind of optical device may be used providing that it has a function for separating light according to each wavelength. For example, it may be an optical fiber grating and an optical circulator connected serially together, an AWG (Arrayed Wave Guide), a combination of an optical coupler and an optical band pass filter, a Mach-Zehnder type interferometer, or combinations of these connected in cascade fashion. An identical optical device may be used as the optical multiplexer 145, but it does not necessarily.have to have wavelength selectivity and may for example be an optical coupler or the like.

In FIG. 2, the wavelengths of the input and output optical signals of the intra-site circuits are λa and λb, but identical wavelengths may also be used. Further, the optical signal wavelengths transmitted between the inter-site circuits 102, 111 are the four wavelengths λ1–80 4, as wavelength control is easiest for this case. However, the operation is unaffected even if the input/output wavelengths are different. Further, the number of signals, number of optical transceivers or bit rate may be different on the uplink and downlink according to the transmission capacities of the uplink circuit and downlink circuit.

The invention is not limited by this embodiment, and if there are a plural number of intra-site circuits, these may perform wavelength division multiplexing transmission on one optical fiber circuit. The uplink/downlink circuits may also be multiplexed using an optical circulator or optical coupler, and one optical fiber circuit may be used for two-way transmission. Further, wavelength division multiplexing and two-way transmission can be applied simultaneously.

Figure 3:
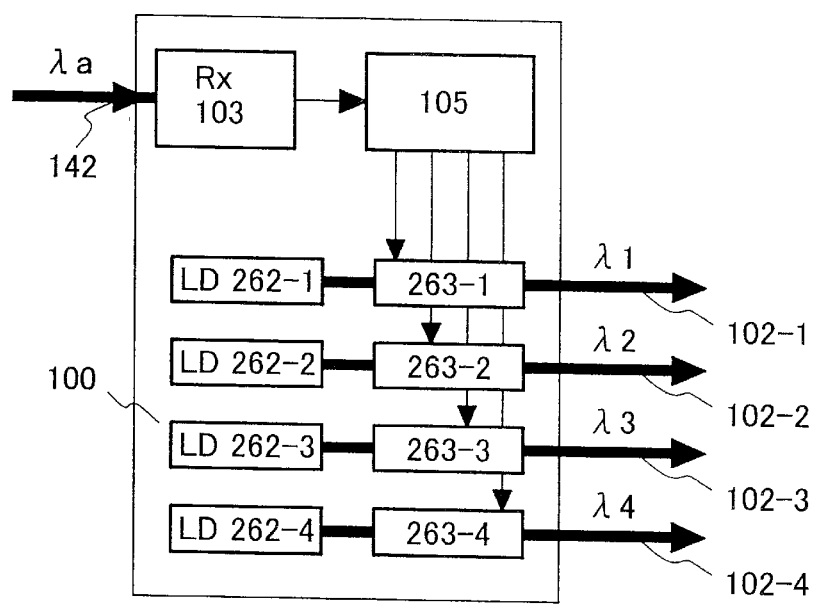
FIG. 3 is a second embodiment of a transmitting side transponder according to this invention.

FIG. 3 shows the construction of an embodiment of the transponder 100 according to this invention. This embodiment comprises a transmitting optical source which uses wavelength variable lasers 262-1–4.

The high-speed information signal from the intra-site optical fiber 142 is demultiplexed into four signals by the demultiplexing circuit 105 via the optical receiver 103, these are respectively applied to external optical modulators 263-1–4 which modulate the output light of the wavelength variable lasers 262-1–4, and the result is output as an inter-site optical signal. The output wavelengths λ1–λ4 are preset to wavelengths required for inter-site transmission, or are set to desired wavelengths by an internal wavelength reference circuit or external control signal.

By using this wavelength variable laser, one transponder can be used for a wavelength division multiplexing optical transmission device requiring any wavelength, so the invention has wider utility.

The variable wavelength laser 262 may be various types of laser such as, for example, an external cavity type which uses a semiconductor laser, or a fiber ring laser. The output light of a laser which outputs optical signals of plural wavelengths may also be multiplexed according to each wavelength. Further, the wavelength variable function can be implemented even if only the laser part can be individually replaced.

The external optical modulator 263 may for example be an electro-absorption type semiconductor optical modulator, or a semiconductor or lithium niobate type Mach-Zehnder type optical modulator. A modulation scheme such as phase modulation or duo-binary modulation can also be used.

Figure 4:
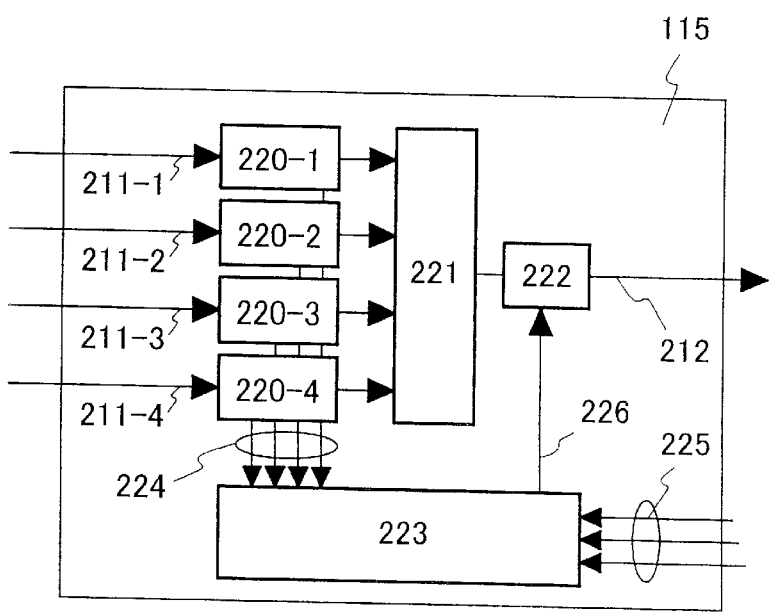
FIG. 4 is a schematic view of a multiplexing circuit used in the transponder according to this invention.

FIG. 4 shows the construction of one form of the multiplexing circuit 115 used for the aforesaid transponder of the receiving part.

This form shows an example of the construction when SONET multiplexing is performed using SONET signals for input/output. This is input from four input circuits 211-1–211-4.

For example, 2.5 Gbit/s OC-48 are respectively input to low speed circuit terminal circuits 220-1–220-4, header information 224 is extracted such as the section overhead in the SONET frame, encoding errors are detected and upstream equipment fault information is extracted, and terminal processing such as frame sync is performed. The information signals contained in the payload are sent to a SONET multiplexing circuit 221, and multiplexed into a high-speed signal. At the same time, the low speed circuit header information which was extracted is input to a header information processing circuit 223 together with a device internal state signal 225 pertaining to the device, edited as high-speed circuit header information, and sent to a high-speed circuit terminal circuit 222. The header information 226 is again added to the multiplexed information signal by the high-speed circuit terminating circuit 222, and pointer processing or the like is performed. The signal is then converted to a 10 Gbit/s OC-192 signal, and is output from an output circuit 212. The demultiplexing circuit has effectively the reverse construction.

This embodiment was described in the case where the input/output signal formats were both SONET signals. At least one of the input or output may be another signal format such as ATM, Gigabit Ethernet or wavelength wrapping, but in this case the signal terminal configuration and the construction of the format conversion part will be slightly different for each format. The transmission speed after multiplexing also depends on the input/output signal format, and it is not necessarily equal to the sum of the input circuits. For example, in the aforesaid wavelength wrapping, it may occur that an error correction information signal is added and the transmission bit rate increases by about 10 to 20 percent. Further, it may also occur in the case of IP packet transmission that the bit rate after multiplexing by statistical multiplexing falls. The above is identical in the case of demultiplexing.

Hence, according to this embodiment, by converting high-speed intra-site optical circuit signals to low speed wavelength division multiplexed signals and performing long-distance (inter-site) transmission, in the inter-site part, the bit rate can be decreased to a value at which long-distance transmission is possible, sufficient transmission distance can, be obtained and there is no longer any need to shorten the inter-site repeater interval even if the intra-site circuits are high speed circuits. Conversely, by applying this invention also to existing wavelength division multiplexing optical transmission devices, the intra-site circuit speed can be increased without having an adverse effect on the transmission distance or wavelength arrangement.

Figure 5:
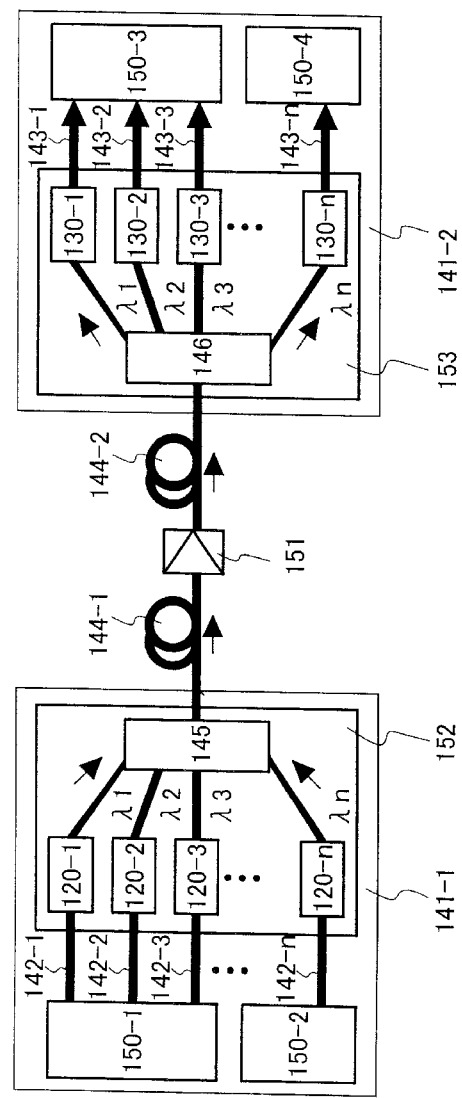
FIG. 5 is a schematic view showing a prior art wavelength division multiplexing optical transmission system.
Figure 6:
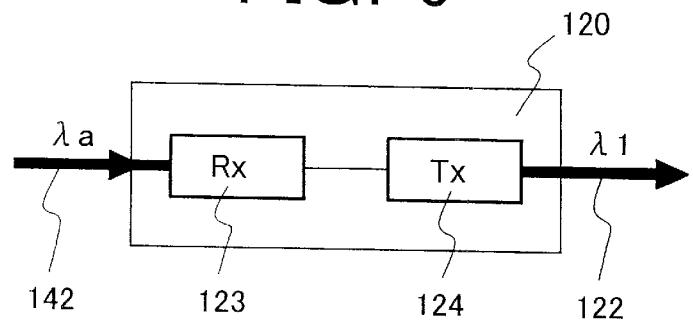
FIG. 6 is a schematic view of the transmitting side transponder used by the prior art wavelength division multiplexing optical transmission system.
Figure 7:
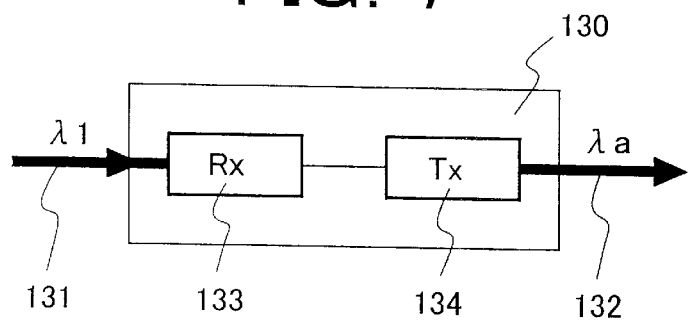
FIG. 7 is a schematic view of a receiving side transponder used by the prior art wavelength division multiplexing optical transmission system.

For example, if the transmission speed is 2.5 Gbit/s per wavelength in the inter-site wavelength multiplexing circuit of the wavelength division multiplexing optical transmission devices 152, 153 in FIG. 5, even if it is attempted to increase the intra-site circuit speed and inter-si e circuit speed by, for example, four times to 10 Gbit/s, the wavelength division multiplexing transmission device itself is normally designed assuming 2.5 Gbit/s, so in the prior art, this kind of upgrade was difficult or impossible. For example, if the transmission bit rate is increased to high speed, the wavelength spectrum of the wavelength division multiplexed signals largely widens or the receiving sensitivity of the optical receiver deteriorates, so transmission characteristics deteriorate. If the transmission devices 152, 153 were replaced by 10 Gbit/s devices, for example, the maximum transmission distance or maximum span interval would decrease for an optical transmission device of 10 Gbit/s as compared to 2.5 Gbit/s, so there would be a need to place more optical wavelength division multiplexing repeaters in the inter-site circuit and the system would.become more costly.

On the other hand, in the wavelength division multiplexing transmission system of this invention, even if the speed of the inter-site interface is increased to, for example, 10 Gbit/s, wavelength division multiplexing transmission can still be performed in the inter-site part at 2.5 Gbit/s, which is the prior art.bit rate, so the above problem is avoided. Due to the increase of transmission speed, the transmission distance in the intra-site interface part becomes shorter, but as the transmission distance in the inter-site transmission part is.only several to several tens of kilometers at most, this is not a problem in practice. As a result, the number of intra-site circuits and inter-site interfaces can be reduced to ¼ as compared to the prior art method, which offers-a great advantage in terms of circuit management and cost. Also, if high speed intra-site interfaces such as 40 Gbit/s or 160 Gbit/s are used, the number of intra-site circuits can be further reduced.

In the wavelength division multiplexing transmission system of this invention, the transmission speed of the intra-site/inter-site circuits is not limited to the above values, and can be set freely provided that the intra-site circuit speed is greater than the inter-site circuit speed at which wavelength division multiplexing transmission takes place. For example, the intra-site circuit speed may be set to 40 Gbiz/s and the inter-site transmission speed to 10 Gbit/s, or the inter-site transmission speed may be set to 5 Gbit/s and the intra-site circuit speed to 10 Gbit/s, 20 Gbit/s or 40 Gbit/s. Further, if one intra-site circuit is split between plural inter-site circuits, there is no need to divide it into signals of equal transmission speed. There is also no problem if an intra-site circuit signal of, for example, 10 Gbit/s is split into two signals for transmission, i.e., 5 Gbit/s and 2.5 Gbit/s, according to the characteristics of the equipment on the transmitting and receiving sides. If the distance between the information communications devices and transponders is short, the intra-site optical fiber circuits 142-1, 143-1 do not necessarily have to be optical circuits which use optical fibers, and transmission is possible also using coaxial cables or parallel electrical signals. In the embodiment of FIG. 1, the case was shown where this invention was applied to both the transmitting and receiving sites, but this is not absolutely necessary, it being possible to have a construction where the transponder of this invention is applied to either of the transmission side or receiving side sites alone.

The wavelength division multiplexing transmission system of this invention resolves the problem of transmission distance, which occurs in optical signal transmission at high speeds of several Gbit/s and above, using the wavelength division multiplexing technique which is unique to optical transmission. Specifically, this invention aims to reduce costs, cut down the number of circuits and extend the transmission distance of the inter-site optical interface part by converting the intra-site optical interface part to high-speed, and it is basically different from the prior art inverse MUX method. Therefore, the application range of this invention covers wavelength division multiplexing transmission devices, transponders and information communication devices connected to them and their interfaces, and wavelength division multiplexing transmission systems using these devices, so the embodiments are also unique to these devices and systems.

In addition to the IM/DD (direct modulation/direct reception) method for semiconductor lasers in wavelength bands such as the 1.3 $\mu$m band which is often widely used for intra-site transmission signals, the 1.5 $\mu$m band or external optical modulation method can also be used. According to this embodiment, and in particular because the transmission speed of the intra-site circuits is high, the external modulation method may prove to be more suitable than the prior art direct modulation method. Further, the signal may be wavelength division multiplexed and transmitted together with signals from other intra-site circuits, and if necessary, dispersion compensated or optically amplified. It should be noted that the term "intra-site" may in practice be used also for connections between plural sites or information communications devices where intra-site circuits are disposed at close distances (several tens of km).

As the wavelength of the inter-site transmission optical signal, a wavelength suited to wavelength division multiplexing transmission is used. In addition to signals in the 1.5 $\mu$m band which is suitable for amplification by optical fibers, and which complies with the wavelength grid specified as the wavelength for WDM by ITU-T, the 1.3 ||m band can also be used. In particular, as the inter-site transmission bit rate can be reduced in this wavelength division multiplexing transmission system, in some cases, not only a modulation scheme such as external-optical modulation but also a low chirp LD or the like can be used.

As the intra-site/inter-site optical signal format, the signal format of the intra-site optical fiber circuit 142-1 may for example use SONET/SDH. For example, in the case of the OC-192 signal (10 Gbit/s) the output signal of the transponder 100 may be separated into four OC-48 signals (2.5 Gbit/s), but any other desired format can be used.

Embodiment 2

Figure 8:
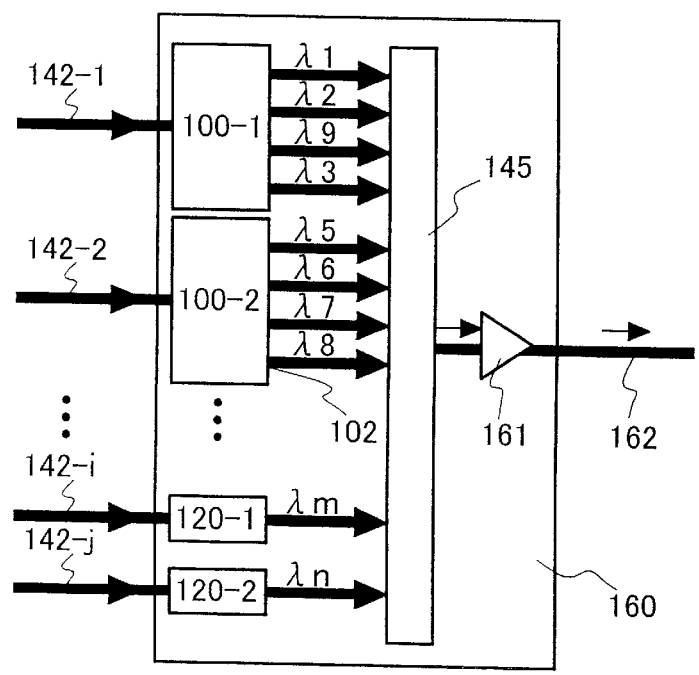
FIG. 8 is a schematic view showing a second embodiment of a wavelength division multiplexing optical transmission device according to this invention.

FIG. 8 is a schematic view of a second embodiment of the wavelength division multiplexing optical transmission device (transmitting side) according to this invention.

In a wavelength division multiplexing optical transmission device (transmitting side) 160, optical signals input from the intra-site side input fibers 142-1, 142-2 are respectively received by transponders (transmitting side) 100-1, 100-2, demultiplexed and converted to plural (four in FIG. 8) optical signals suitable for wavelength division multiplexing for low speed inter-site transmission, and output from the inter-site side output optical fiber 102. These signals are wavelength division multiplexed by the optical multiplexer 145, amplified by an optical amplifier 161, and output to an inter-site optical fiber circuit 162. Optical amplifiers or means to perform dispersion compensation and prevent signal quality and waveform deterioration can further be added to the inter-site/intra-site circuit part as desired. In this embodiment, an example is shown where signals from the prior art transponders 120-1, 120-2 are also input to the optical multiplexer 145, wavelength division multiplexed, and transmitted.

In the diagram, the output wavelengths of the inter-site side output fiber 102 of the transponder 100-1 are $\lambda 1, \lambda 2, \lambda 9$ and $\lambda 3$, but there is no particular limitation on the order or interval of these wavelengths provided that the signal wavelengths output to the same inter-site fiber are mutually different.

For example, if the inter-site optical fiber circuit Is a dispersion shift fiber, to suppress the optical four-wave mixing effect, a wavelength arrangement with unequal intervals can even be adopted.

Embodiment 3

Figure 9:
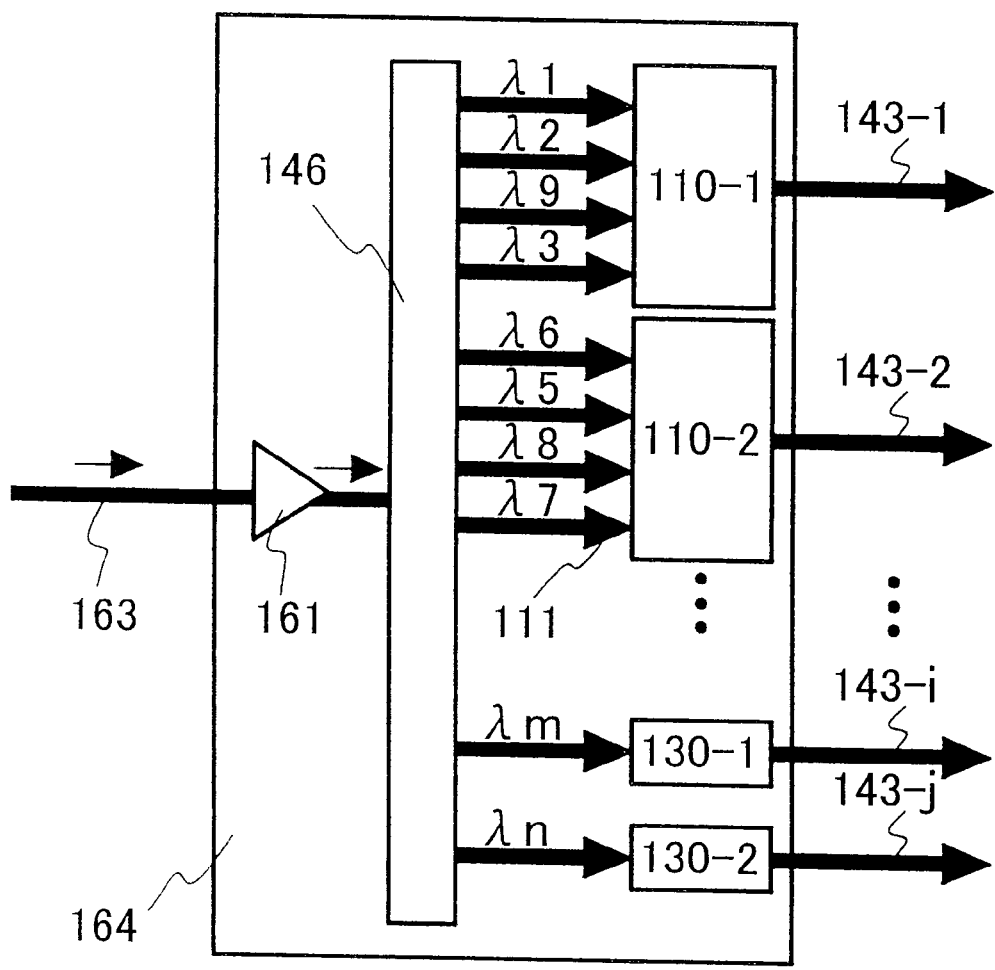
FIG. 9 is a schematic view showing a third embodiment of the wavelength division multiplexing optical transmission device according to this invention.

FIG. 9 shows a schematic view of a third embodiment of a wavelength division multiplexing optical transmission device (receiving side) according to this invention. This embodiment is a device which receives the optical multiplexed signals from the wavelength division multiplexing transmission device (transmitting side) of FIG. 8.

In a wavelength division multiplexing optical transmission device (receiving side) 164, the wavelength division multiplexed optical signal input from an inter-site side input fiber 163 is amplified if necessary by the optical amplifier 161, and demultiplexed into separate wavelengths by the optical demultiplexer 146. Also according to this embodiment, if necessary, optical amplifiers or optical dispersion compensating means may be added as required to the inter-site/intra-site circuit parts. The optical signals demultiplexed into each wavelength are respectively received by transponders (receiving side) 110-1, 110-2 according to this invention and the prior art transponders 130-1, 130-2.

In each of the transponders 110-1, 110-2, the four signals received from the inter-site circuit are respectively multiplexed into one high-speed intra-site signal, and output to the intra-site circuits 143-1, 143-2. In the case of the prior art transponders 130-1, 130-2, the received inter-site optical signals are converted to intra-site optical signals and output at the same transmission speed.

The four wavelengths $\lambda 1, \lambda 2, \lambda 9, \lambda 3$ are received from the inter-site side input fiber 111 of the transponder 110-1, but there is no particular limitation on the order or interval of these wavelengths. In principle, a 1:1 correspondence between the intra-site circuits in the transponders on the transmitting/receiving sides is achieved by maintaining correspondence with the transponders on the transmitting side. In one embodiment described hereafter, an example is shown wherein the wavelength arrangements on the transmitting and receiving sides are purposely arranged to be different.

Embodiment 4

Figure 10:
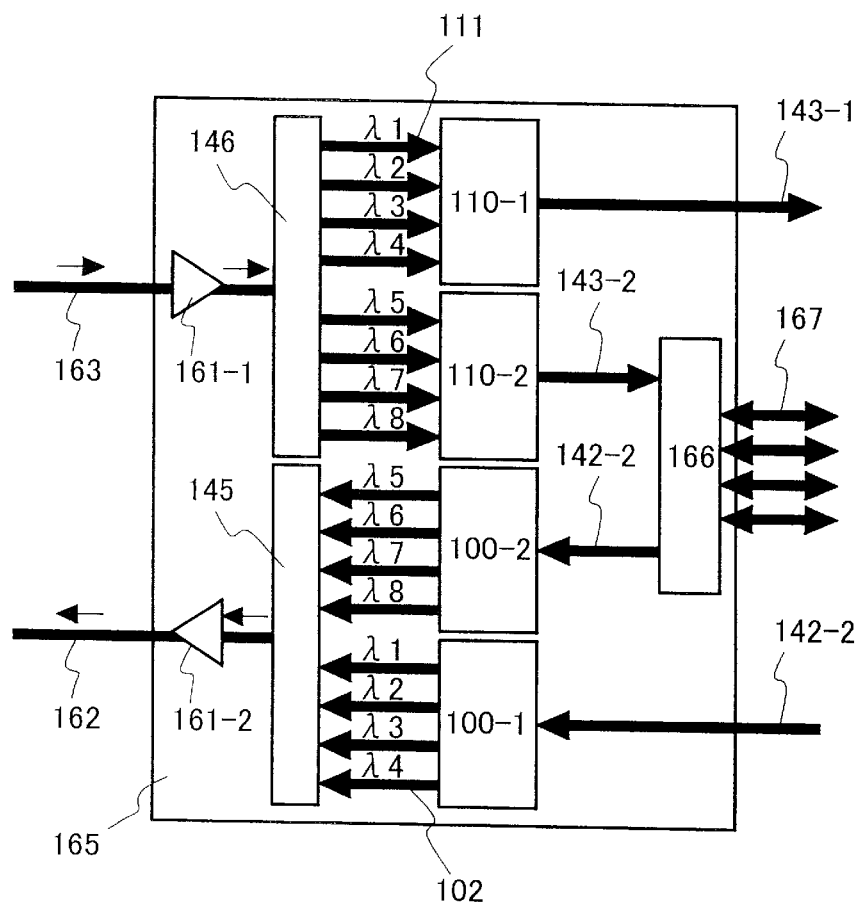
FIG. 10 is a schematic view showing a fourth embodiment of the wavelength division multiplexing optical transmission device according to this invention.

FIG. 10 is a schematic view of a fourth embodiment of the wavelength division multiplexing optical transmission device according to this invention. A wavelength division multiplexing optical transmission device 165 of this embodiment basically comprises the wavelength division multiplexing optical transmission devices on the transmitting side and receiving side of FIG. 8 and FIG. 9 in a one-piece construction, and although prior art transponders are not used, they can be added.

An optical signal input from the inter-site side input optical fiber 163 is demultiplexed into eight wavelengths $\lambda 1 - \lambda 8$ by the optical demultiplexer 146, input to the transponders 110-1, 110-2 (receiving side) four wavelengths at a time, and multiplexed into high-speed intra-site circuit signals which are respectively output from the intra-site optical fiber circuits 143-1, 143-2. The intra-site circuit signals input from the intra-site optical fiber circuits 142-1, 142-2 are also respectively demultiplexed to inter-site transmission optical signals of wavelengths $\lambda 1 - \lambda 4$ and $\lambda 5 - \lambda 8$ by the transponders 100-1, 100-2, wavelength division multiplexed by the optical multiplexer 145, and output from the inter-site side output optical fiber 162.

In the embodiment shown, an information communications device 166 is built into the wavelength division multiplexing optical transmission device 165. In this embodiment, the intra-site optical circuits 143-2, 142-2 interconnect the transponders 110-2, 100-2 and the information communications device 166 inside the wavelength division multiplexing optical transmission device 165.

The information communications device 166 may comprise various devices such as a SONET/SDH terminal device, IP router, ATM terminal or ATM switch. As input/output circuits 167 connecting with the outside, various circuits may be used such as SONET/SDH circuits, ATM circuits, Ethernet circuits such as Gigabit Ethernet, or FDDI circuits. If the distance between the information communications device 166 and the transponders 100-2, 110-2 is short, the intra-site optical fiber circuits 143-2, 142-2 are not necessarily optical circuits using optical fibers, and transmission may be effected also by coaxial cables or parallel electrical signals. Also, conversely to the embodiment of FIG. 10, the construction may comprise the transponder or wavelength division multiplexing optical transmission device of this invention as part of the information communications device 166.

Embodiment 5

Figure 11:
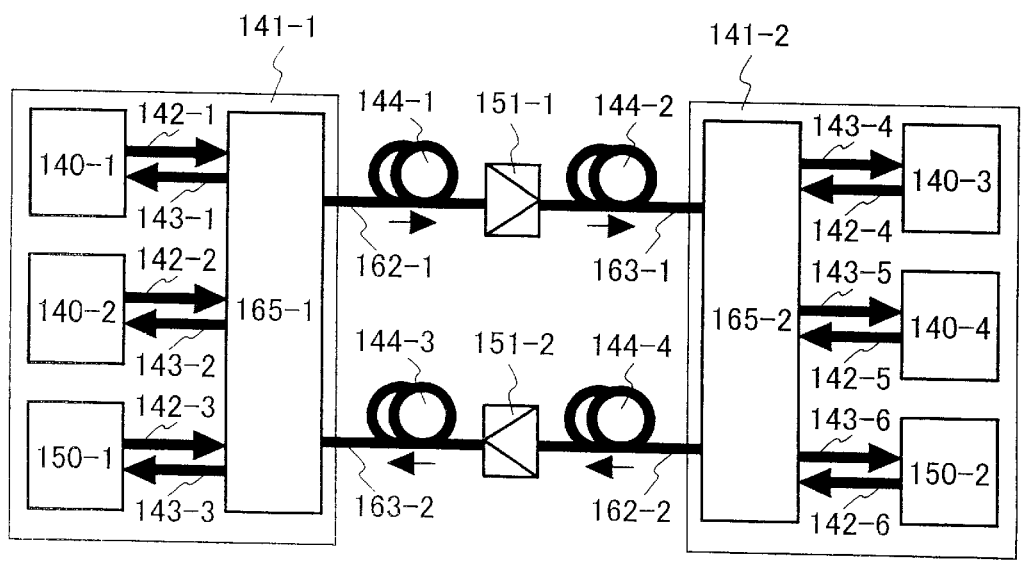
FIG. 11 is a schematic view of a second embodiment of the wavelength division multiplexing optical transmission system according to this invention.

FIG. 11 is a schematic view of a second embodiment of the wavelength division multiplexing optical transmission system according to this invention. This embodiment is an example wherein the sites 141-1, 141-2 are connected by the two uplink/downlink inter-site optical fiber circuits 144 using wavelength division multiplexing optical transmission devices 1651, 165-2 having an integral transmitting/receiving construction identical to that of FIG. 10.

A linear optical repeater 151-1 using an optical amplifier is disposed midway in the inter-site optical fiber circuits 144-1, 144-2, and amplifies a wavelength division multiplexed optical signal which has been attenuated by optical fiber losses. The wavelength division multiplexing number of this type of wavelength division multiplexing optical transmission system may exceed a maximum of 100 wavelengths, but whereas in the prior art the same number of intra-site circuits was required, according to this embodiment, plural inter-site circuits can be multiplexed and connected to an information communications device 140 of this invention, so the number of intra-site optical fiber cables or circuits is reduced and they are easy to manage. Further, according to this embodiment, the information communications device 140 and wavelength division multiplexing optical transmission device 165 are connected by one of the intra-site optical fiber circuits 142, 143 each for the uplink/downlink, but they may be connected by plural circuits.

Embodiment 6

Figure 12:
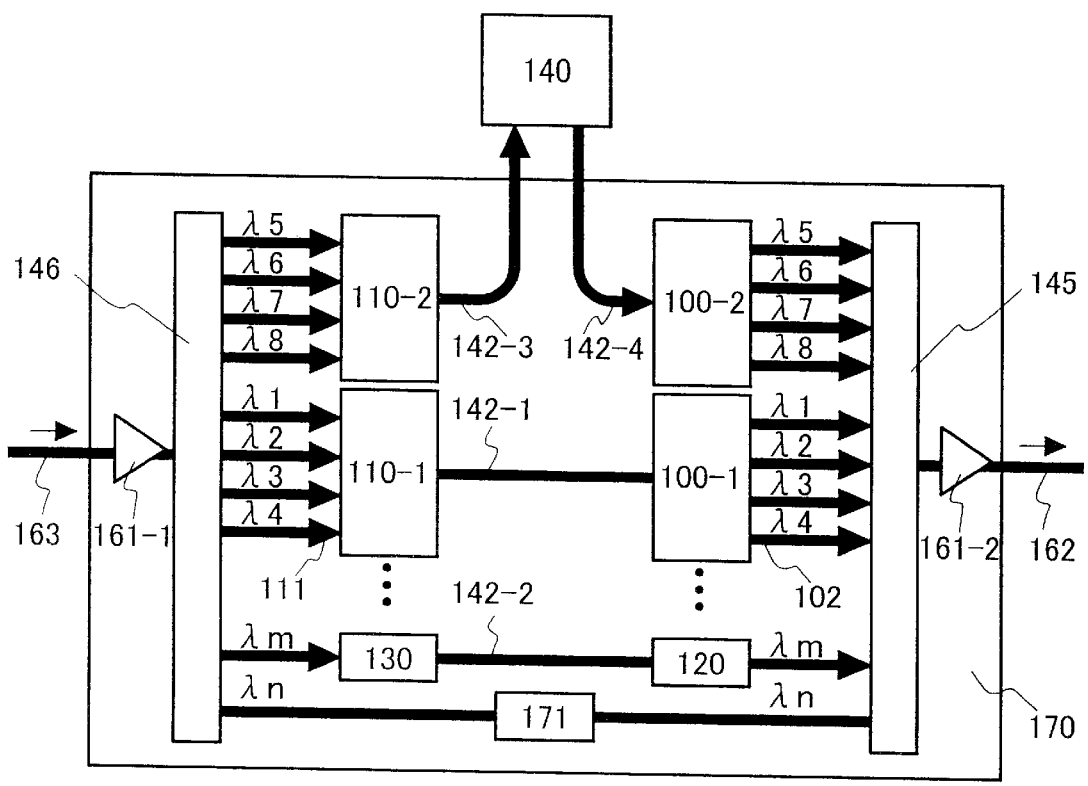
FIG. 12 is a schematic view of a fifth embodiment of the wavelength division multiplexing optical transmission device according to this invention.

FIG. 12 is a schematic view of a fifth embodiment of the wavelength division multiplexing optical transmission device according to this invention. This embodiment shows a construction wherein a wavelength division multiplexing optical transmission device 170 uses an optical repeater.

This repeater first converts.the optical signal to an electrical signal, and then performs waveform regeneration, re-timing and amplification.

The wavelength division multiplexed optical signal input from the inter-site side input optical fiber 163 is amplified by an optical amplifier 161-1, and demultiplexed to individual wavelength components by the optical demultiplexer 146. Of these, the optical signals of wavelengths $\lambda 1 - \lambda 4$ are multiplexed into one intra-site optical signal by the transponder (receiving side) 110-1, and transmitted to the transponder (transmitting side) 100-1. This is then again demultiplexed to the wavelength division multiplexed signals $\lambda 1 - \lambda 4$ for inter-site transmission, wavelength division multiplexed by the optical multiplexer 145, and output to the inter-site side output optical fiber 162.

In the repeater 170 according to this embodiment, signals are first relayed via the high-speed intra-site optical fiber circuit 142-1. This has the advantages that the signals in this circuit can be add- dropped, an information communications device is easily connected, and mutual interconnections using transponders from different manufacturers on the transmitting side and receiving side are easily made. When the distance between the transponders 110-1, 100-1 is short, the optical fiber circuit 142-1 may be replaced by an electrical signal circuit.

There is a further advantage in that this optical repeater device comprises plural wavelength division multiplexing devices, so even if the optical demultiplexer 146 and optical multiplexer 145 are separated far from each other, the number of intra-site circuits can be decreased and control is easy.

Although add-drop of a prior art inter-site transmission signal is possible ever with a combination of the prior art transponders (transmitting side) 130, (receiving side) 120, and 171 (for regenerating), it is difficult to demultiplex plural wavelengths and access transmitted information signals using this invention. For example, in this embodiment, an example of an adddrop construction is shown where the intra-site side output fiber 142-3 of the transponder (receiving side) 110-2 and intra-site side input fiber 142-4 of the transponder (transmitting side). 100-2 are connected to an intra-site circuit interface of the information communications device 140. Specifically, the optical signals transmitted with wavelengths $\lambda 1 - \lambda 4$ are dropped in this repeater and passed to the information communications device 140, and the output signal of the information communications device 140 is added to the same wavelengths and then transmitted over the inter-site circuit. Thus, when signals are relayed using the transponder of this invention, an information communications device using this invention can easily be connected to effect an upgrade by an add-drop construction.

Also in this embodiment, dispersion compensation may be performed to compensate for waveform deterioration or signal strength of the optical signal, and optical amplifiers may be inserted in the signal circuit as may be appropriate. SONET signal or other signal terminal circuits may also be disposed in the transponders 110, 100 as necessary.

Further, plural inter-site circuit parts such as uplink/downlink circuits may be combined to form one wavelength division multiplexing optical repeater.

Embodiment 7

Figure 13:
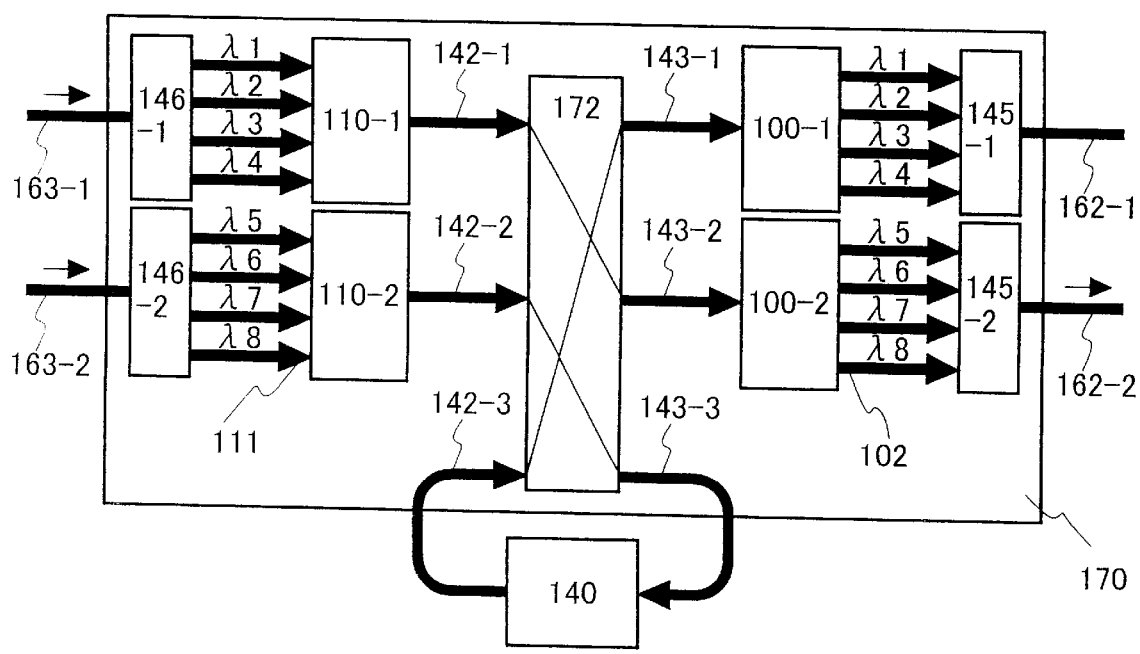
FIG. 13 is a schematic view of a sixth embodiment of the wavelength division multiplexing optical transmission device according to this invention.

FIG. 13 is a schematic view of a sixth embodiment of the wavelength division multiplexing optical transmission device according to this invention. This embodiment is an example wherein variable add-drop and cross-connect functions are added to the optical repeater.

In this embodiment, information signals obtained by demultiplexing inter-site side input optical fibers 163-1, 163-2 into low speed inter-site wavelength division multiplexed signals are multiplexed into high speed intra-site signals by the transponders (receiving side) 110-1, 110-2, and output to the intra-site optical fiber circuits 142-1, 142-2. Also, an information signal from the information communications device 140 is output to the inter-site optical fiber circuit 142-3. These signals are connected to a three-input/three output optical switch matrix 172, and connected to the intra-site optical fiber circuits 1431, 143-2, 143-3 by an external control signal as desired. The intra-site optical fiber circuits 143-1, 143-2 are respectively connected to the transponders 100-1, 100-2 and to the inter-site optical fiber circuits 162-1, 162-2 via the multiplexers 145-1, 145-2, and the remaining intra-site optical fiber circuit 143-3 is connected to the information communications device 140 of this invention. In other words, the connection state between the inter-site circuits and information devices can be varied as desired by changing over the optical switch 172 depending on changes in the traffic pattern or accidents such as fiber breaks.

In the case of this variable add-drop/cross-connect device, according to this embodiment, as plural inter-site circuits are converted into one of the high-speed intra-site circuits 142, there is an advantage in that the scale of the optical switch required need only be 1/N compared to the prior art technique. In the example of four wavelength multiplexing of this embodiment, whereas four sets of the optical switches 172 would be required in the prior art, only one set is needed in this example which is advantageous from the viewpoints of low-cost, high reliability and device scale. In this embodiment also, only one-directional transmission is shown, but the uplink/downlink circuit parts may be combined. Further, the add-drop/cross-connect scheme between wavelength division multiplexed signals and plural optical fiber circuits is not limited to that shown here, any combination being possible. For example, N sets of wavelength division multiplexed signals in one inter-site circuit can be mutually interchanged, or the uplink circuit can be returned to the downlink circuit.

Embodiment 8

Figure 14:
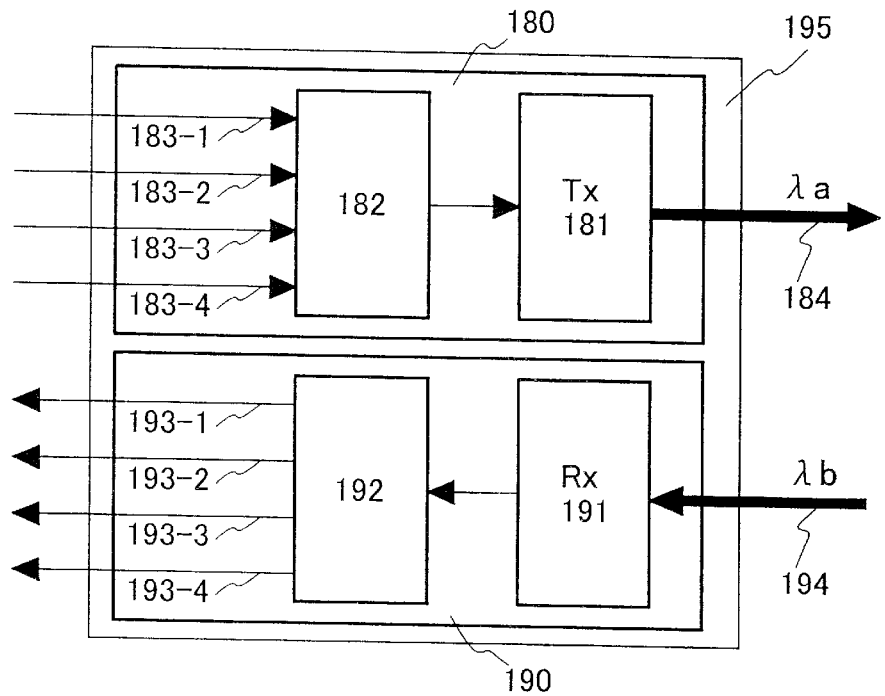
FIG. 14 is a schematic view showing a first embodiment of an intra-site optical interface for the information communications device according to this invention.

FIG. 14 shows the construction of an embodiment of an intra-site interface for an information communications device according to this invention. The information communications device 140 comprises an information communications device intra-site optical interface 195, and the optical interface 195 comprises a transmitting optical interface 180 and receiving optical interface 190. In this embodiment, the aforesaid transponders are connected with the optical interfaces 180, 190 via intra-site side optical fibers 184 and. 194.

In the transmitting optical interface 180, plural information signals input via intra-device circuits 183-1–183-4 are terminated/time division multiplexed by a multiplexing circuit 182, converted to a high speed optical signal by an intra-site optical transmitter 181, and output to an intra-site side output light fiber 184. The signal output by the optical fiber 184 must be a signal capable of being received by the aforesaid wavelength division multiplexing optical transmission device according to this invention connected via intra-site optical fiber circuits, or by the intra-site transmission optical receiver of the transponder according to this invention. Therefore, the multiplexing number and the signal format before and after multiplexing in the multiplexing circuit 182 is identical to that of the aforesaid wavelength division multiplexing optical transmission device or transponder device according to this invention. The intra-device information circuits 183-1–183-4 do not necessarily have to be one signal line, and may be transmitted in parallel using plural signal lines.

In the receiving side optical interface 190, an optical signal of wavelength $\mu b$ sent from the aforesaid wavelength division multiplexing optical transmission device or intra-site transmission optical transmitter of the transponder according to this invention, is received by an inter-site transmission optical receiver 191 via an intra-site side optical fiber 194, terminated if necessary, demultiplexed into the original low speed information signals by a demultiplexing circuit 192, and output from inter-device circuits 193-1–193-4. This embodiment shows an example of an information communications device provided with both a receiving side and a transmitting side optical interface, but only one of these optical interfaces may be provided.

Embodiment 9

Figure 15:
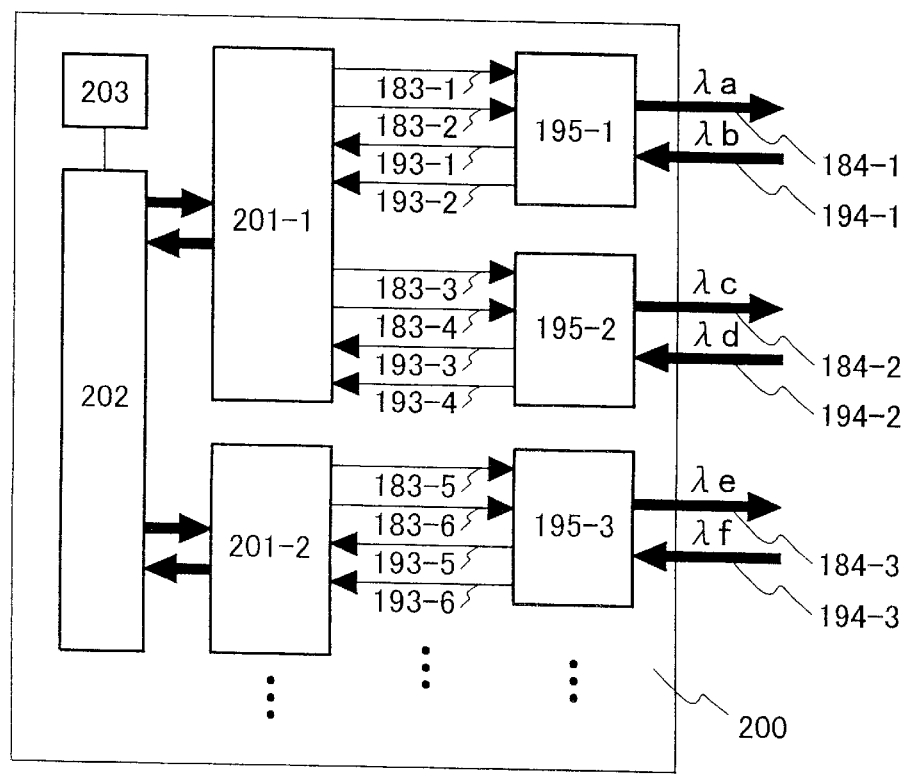
FIG. 15 is a schematic view showing a first embodiment of an information communications device according to this invention.

FIG. 15 shows the construction of another embodiment of the information communications device according to this invention. This embodiment also uses the intra-site optical interface (receiving side and transmitting side) of the information communications device according to this invention.

This embodiment shows the construction of an IP router switch 200 as the information communications device. Intra-site optical interfaces 195-1, 195-2 for the information communications device 200 are connected to a switch matrix 202 via a routing module 201-1, and thereby form an IP router. The switch matrix 202 is controlled by a routing control circuit 203, and IP packets input from the interfaces are transferred to a destination interface.

According to this embodiment, the intra-site interfaces 195 each multiplex/demultiplex two of the low speed intra-device circuits 183. The two intra-device circuits 183-1, 183-2 are multiplexed by the intra-site interface 195-1, and output from the intra-site side output optical fiber 184-1 as a high speed signal. After these multiplexed signals have been transmitted through intra-site circuits, they are demultiplexed into each wavelength by the aforesaid wavelength division multiplexing optical transmission device and transmitted. Therefore, if the inter-device circuits 183-1, 183-2 are treated as independent signal interfaces or input/output ports, robustness to device faults can be improved, and as there is no need to consider the differential group delay of the two ports, the device construction can be simplified. Further, as independent routing is performed for each port, a configuration described hereafter is possible wherein a wavelength division multiplexed signal is add-dropped or routed for each wavelength.

The information communications device according to this invention is not limited to this embodiment, various constructions being possible such as SONET/SDH/ATM multiplexing terminal devices comprising an intra-site interface or transceiver according to this invention, or demultiplexing/exchange/switching/fault recovery/bit rate conversion or add-drop devices.

Embodiment 10

Figure 16:
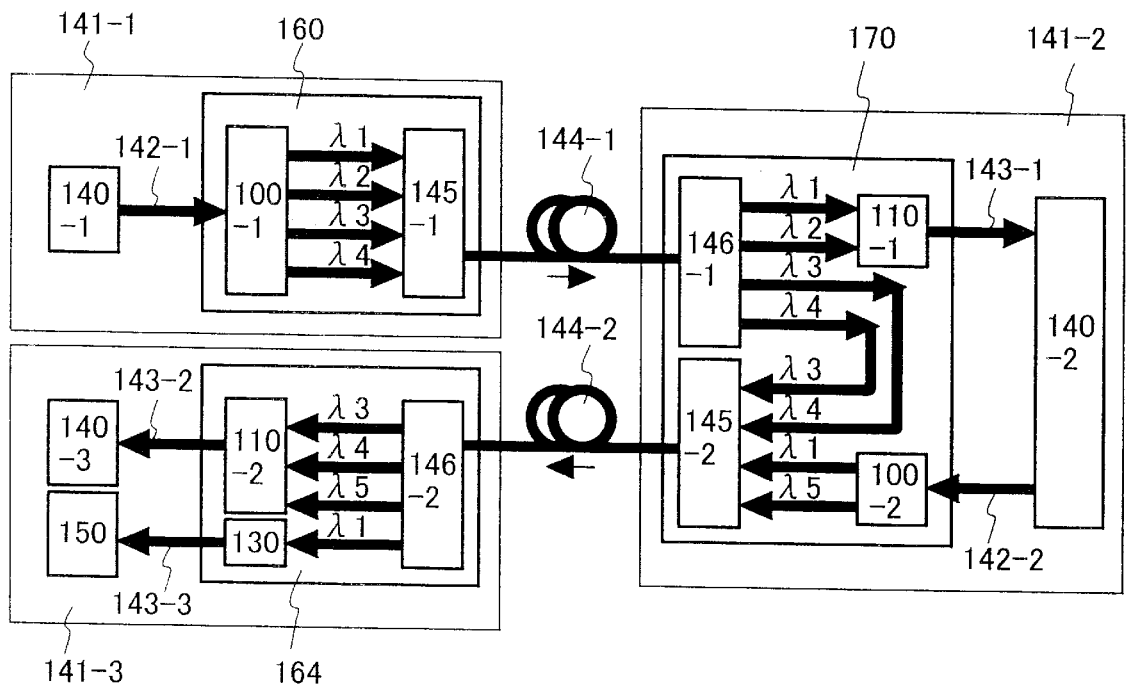
FIG. 16 is a schematic view showing the third embodiment of the wavelength division multiplexing optical transmission system according to this invention.

FIG. 16 shows the construction of a third embodiment of the wavelength multiplexing optical transmission system according to this invention.

In this embodiment, an example is shown wherein the three sites 141-1, 141-2 and 141-3 are connected by the inter-site optical fiber circuits 144-1, 144-2, but only the uplink circuit is shown for the sake of simplicity. In particular, a wavelength add-drop example is shown wherein, of those wavelength-routed and wavelength division multiplexed optical signals obtained by assigning information signals divided into plural wavelengths to different destinations for each wavelength, only required wavelengths are accessed.

A high-speed information signal sent by the intra-site circuit 142-1 from the information communications device 140-1, is converted into wavelength division multiplexed optical signals of wavelengths $\lambda 1$–$\lambda 4$ by the wavelength division multiplexing optical transmission device 160, multiplexed by an optical multiplexer 145-1, and transmitted to the inter-site optical fiber circuit 144-1.

In the wavelength division multiplexing optical transmission device 170, the signals of wavelengths $\lambda 1$ and $\lambda 2$ of the received wavelength division multiplexed optical signals are dropped, and sent to the information communications device 140-2 via the transponder 110-1. The information signal from the information communications device 140-2 is divided into the two wavelengths, $\lambda 1$ and $\lambda 5$, by the transponder 100-2, multiplexed with the optical signals of wavelengths $\lambda 3$, $\lambda 4$ which are through signals, and transmitted to the wavelength division multiplexing optical transmission device 164 via the inter-site optical fiber circuit 144-2. The signals of wavelengths $\lambda 3$, $\lambda 4$, $\lambda 5$ are multiplexed by the transponder 110-2, and sent to the information communications device 140-3. The signal of wavelength $\lambda 1$ is received by the prior art transponder 130, and sent to the prior art information communications device 150.

According.to this embodiment, one intra-site circuit signal is demultiplexed into plural wavelengths for transmission, and to achieve wavelength routing or wavelength add-drop, the information signals must have separate contents and destinations for each wavelength. Specifically, in the information transmission device of this invention, plural independent Intra-device signal circuits/interfaces/input-output port signals corresponding to the number of wavelengths in the inter-site part should be multiplexed in advance as one intra-site circuit. If this is done, the optical signals after wavelength demultiplexing can be given full compatibility with prior art wavelength division multiplexed optical signals, so prior art transponders or optical wavelength division multiplexing transmission devices may be freely mixed with the other devices to construct the optical transmission system.

Embodiment 11

Figure 17:
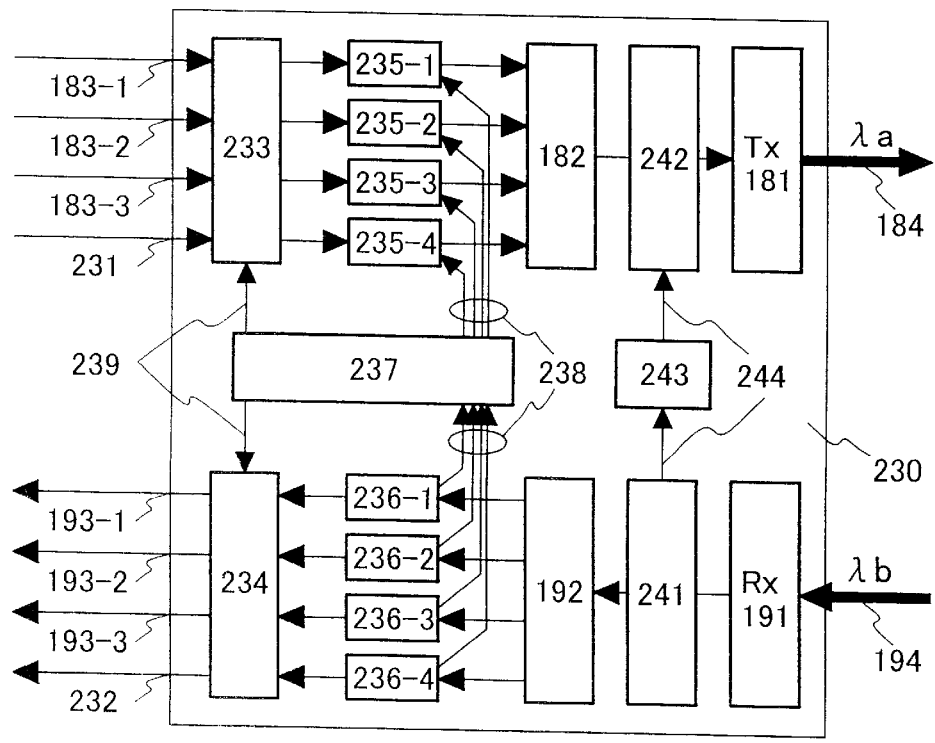
FIG. 17 is a schematic view showing a second embodiment of the transponder according to this invention.

FIG. 17 shows the construction of a second embodiment of an intra-site interface for the information communications device according to this invention. In this embodiment, some of the plural wavelengths used for information transmission in the inter-site part are used, so it is used for fault recovery with redundancy. The information communications device in the other site connected by the inter-site optical fiber circuits also comprises an intra-site interface identical to that of this embodiment.

In the transmitting part of an intra-site interface 230, header information such as circuit status or priority is added by header adding circuits 235-1–2 to the three intra-device circuits 183-1–183-3 and the information signal of an intra-device circuit 231 of low priority, multiplexed by the multiplexing circuit 182, and output to the high-speed intra-site circuit 184.

In the receiving part, a signal of the intra-site circuit.194 is demultiplexed by the demultiplexing circuit 192, the header information of each signal is extracted by header extracting circuits 236-1–236-4, a switching circuit 234 is controlled by a switch control circuit 237 using this header information, and information signals are output as the intra-site circuits 193-1–193-3 and a low priority intra-device circuit 232. When there is a fault of the wavelength division multiplexing transmitter in the inter-site circuit part, this situation is detected from header information 238, and the switch control circuit 237 performs a recovery operation by changing over switching circuits 233, 234 according to the status.

For example, if one of the inter-site circuits corresponding to the received intra-device circuits 193-1–193-3 has a malfunction, a 3:1 fault recovery mechanism can be implemented wherein this situation is notified to the transmitting side using the header information, the switching circuit 233 is changed over on the transmitLing/receiving sides, and the information is transmitted instead to the low priority circuit 231, which is a standby circuit. The capacity allocation of the standby circuit and the switching algorithm are not limited to the above, and a recovery mechanism such as for example 1+1 can also be employed. In particular, when an IP router or the like is used as the intra-site device and the plural intra-device circuits of this invention are considered as independent interfaces, they may be treated as plural delivery routes, so a fault recovery function can be implemented without providing a special standby circuit.

Further, in this embodiment, an example is shown where a fault monitoring/notification/error rate correction function of the intra-site circuit is added also to the high-speed intra-site circuit part. This function car be used completely independently regardless of whether or not the aforesaid fault recovery mechanism is provided. A header information extracting/error correcting circuit 241 extracts the header information 244 or error correction signal from the high-speed signal received by the intra-site transmission optical transmitter 191, and performs error correction if necessary. Part of this header information is input to an intra-site circuit header information processing circuit 243. In a.header addition/error correction information adding circuit 242, the fault and alarm:status of the devices, the status of the received intra-site circuit, a CRC (Cyclic Redundancy Check) or FEC (Forward Error Correction) signal which performs error detection or error correction on the transmitted information signal, and a parity bit, are added to the information signal, and output from the intra-site transmission optical transmitter 181. Addition/extraction of the header information does not necessarily have to be performed after multiplexing, and may be performed simultaneously with multiplexing/demultiplexing by the multiplexing/demultiplexing circuit 234, or may be performed on the low speed signal before multiplexing/demultiplexing. Further, this added information is not necessarily in the form of headers, but may for example be time division multiplexed and transmitted together with the information signal as another circuit.

Embodiment 12

Figure 18:
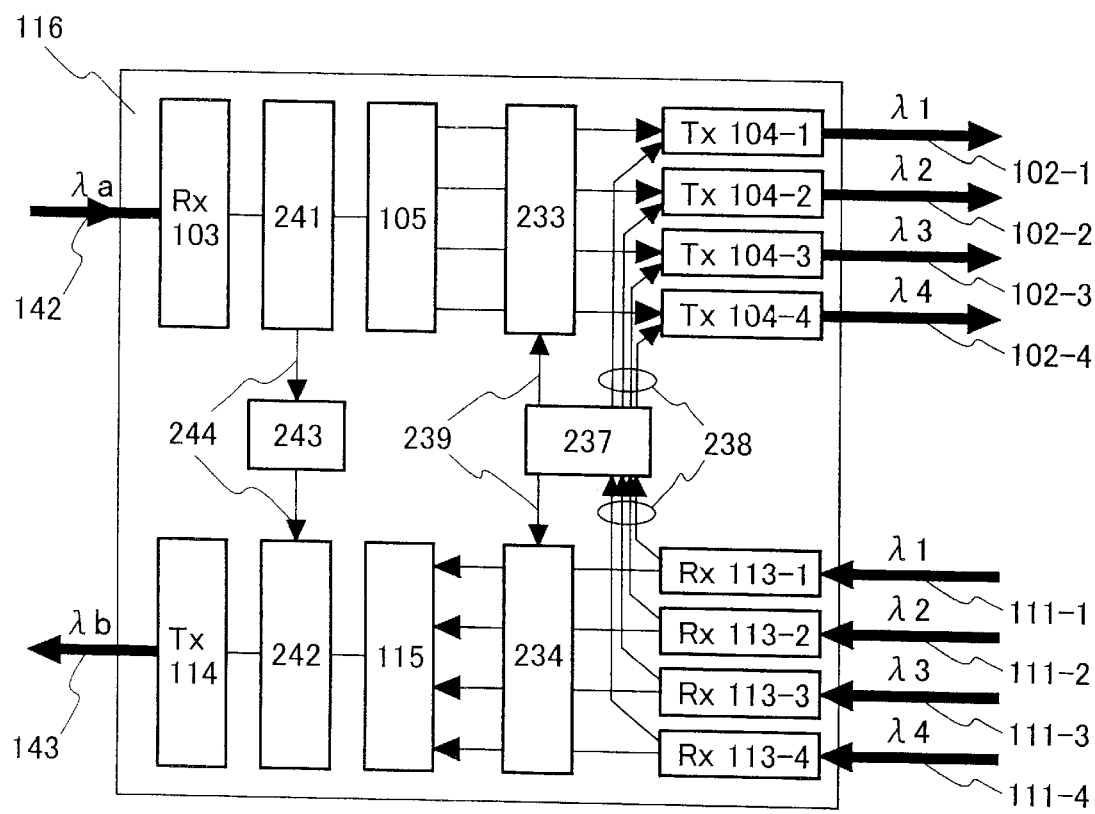
FIG. 18 is a schematic view showing an embodiment of a transponder provided in correspondence to the intra-site interface of FIG. 17.

FIG. 18 shows a third embodiment of the transponder according to this invention. This embodiment is an example wherein a fault recovery mechanism and intra site circuit error correction/monitoring mechanism is incorporated in the transponder part. The fault recovery mechanism, which is identical to the mechanism shown in FIG. 17, determines the fault status of inter-site circuits from header information extracted from the inter-site transmission optical receivers 113-1–113-4, and the switching control circuit 237 performs fault recovery by switching over important signals to standby circuits by the transmitting side and receiving side switching circuits 233, 234. In this diagram, one of the inter-site optical fiber circuits 102-1–102-4 and one of 111-1–111-3 is assigned to a standby circuit. Identical functions and component parts to the construction of FIG. 17 are giver the same symbols, and their description is omitted.

This embodiment also shows an example where circuit fault control/notification/error rate correction functions are added to the high-speed intra-site circuit part. This transponder must be connected opposite to intra-site interface devices and transponders having identical functions. The header information extraction/error correction circuit 241 extracts header information or an error correction signal from the high-speed signal received by the intra-site transmission optical receiver 103, and performs error rate correction if necessary. Part of the header information is input to the intra-site circuit header information processing circuit 243. In the header addition/error correction information adding circuit 242, header information is again added to the information signal, and output from an intra-site transmission optical transmitter 114. This embodiment shows only a construction where transmitting and receiving functions are integrated, but the transmitting side and receiving side may be provided separately.

Embodiment 13

Figure 19:
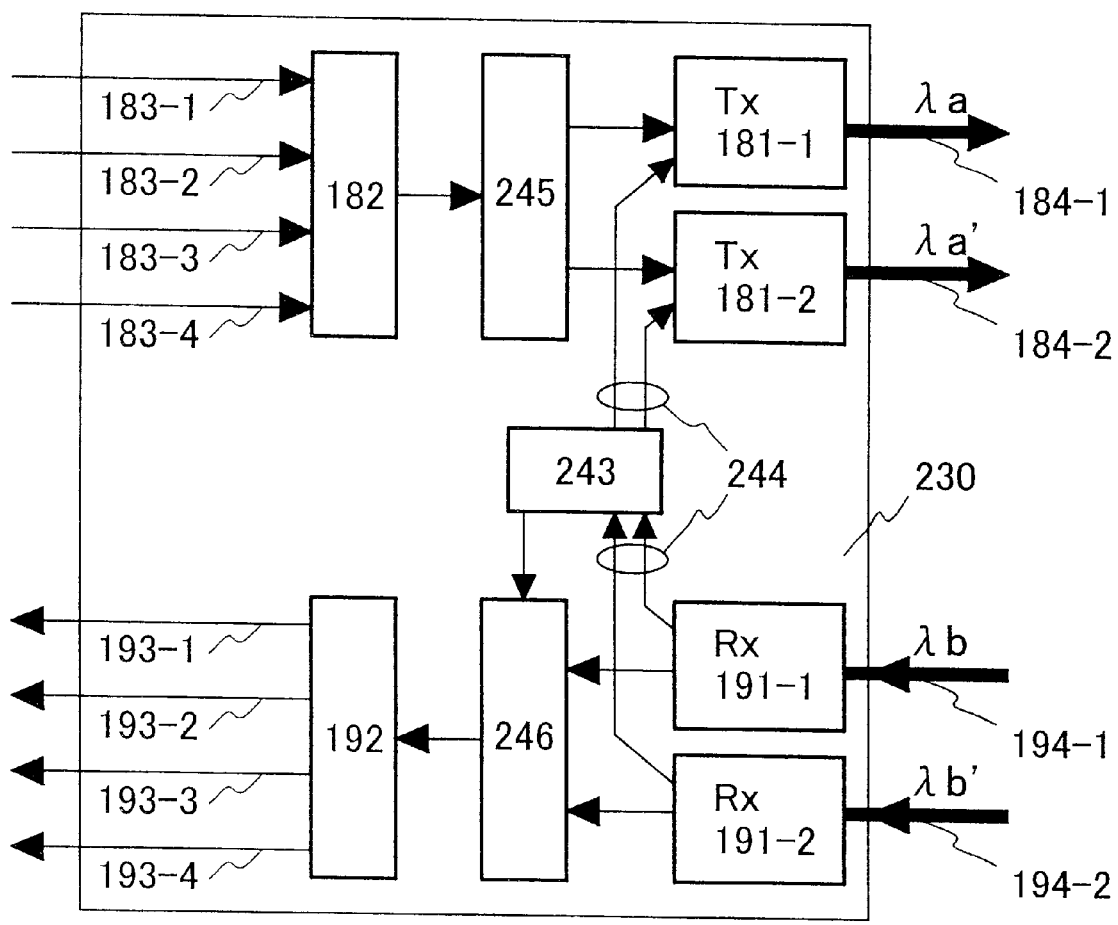
FIG. 19 is a schematic view showing the third embodiment of the intra-site interface according to this invention.

FIG. 19 shows the construction of a third embodiment of the intra-site interface of information communications device according to this invention. This embodiment is an example wherein the intra-site optical fiber circuit part is duplexed, and a fault recovery mechanism is added.

The signal from the intra-device circuits 183-1–183-4 is multiplexed by the multiplexing circuit 182, the multiplexed intra-device signal is split into two by a splitting circuit 245, and the two intra-site circuit optical transmitters .181-1, 181-2 always transmit an identical signal to two intra-site optical fiber circuits 184-1, 184-2. In the receiving part, two circuits of optical signals are always received by two intra-site circuit optical receivers 191-1, 191-2. The intra-site circuit header information processing circuit 243, which receives header information 244 extracted from the received signals, always selects and outputs the higher quality circuit by changing over a switching circuit 246, and sends it to the demultiplexing circuit 192. According to this embodiment, the intra-site circuit part is a high-capacity circuit, and as there are not many circuits, the improvement of reliability due to this fault recovery mechanism based on duplication is effective.

Figure 20:
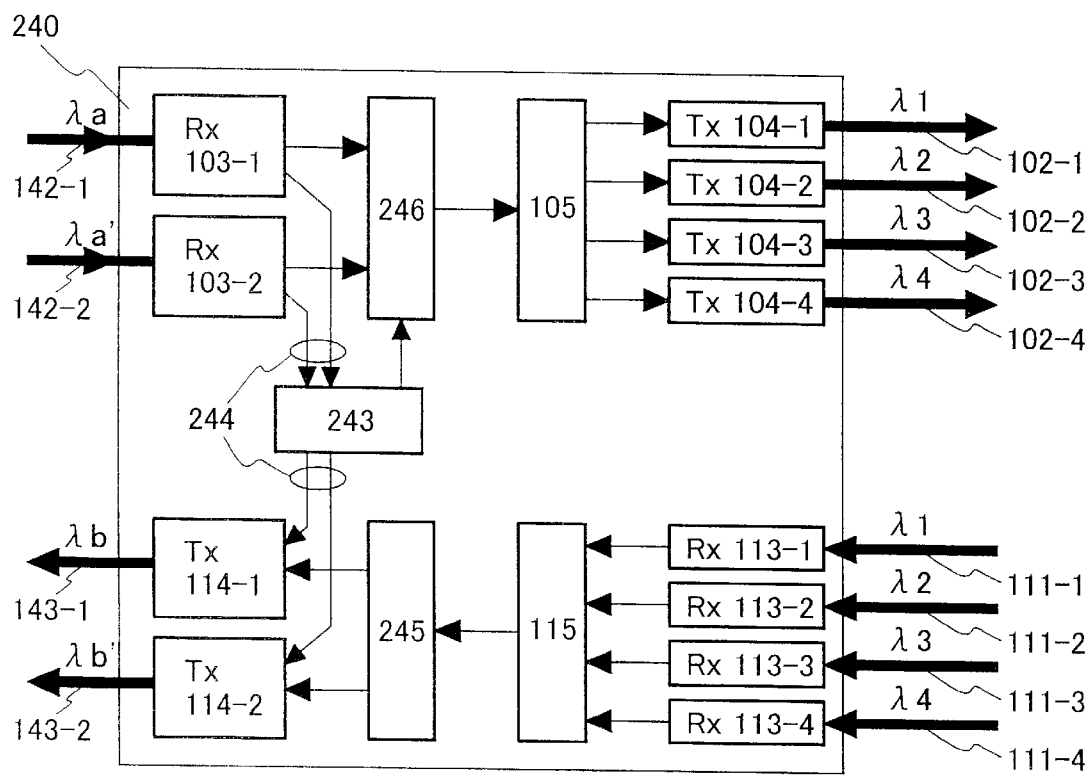
FIG. 20 is a schematic view showing a fourth embodiment of the intra-site interface according to this invention.

FIG. 20 is a transponder having an intra-site circuit duplex function connected opposite the device of FIG. 19. In this embodiment also, the intra-site circuit optical transmitters 114-1, 114-2 always transmit identical information, always select the higher quality or correct.signal from the intra-site circuit optical receivers 103-1, 103-2, and send it to the intra-device circuit.

The two duplexed intra-site circuits may respectively use independent optical fiber circuits, or may perform wavelength division multiplexing transmission by one optical fiber circuit using different wavelengths. Moreover, the aforesaid recovery mechanism can be applied without any problem even if intra-site interfaces or transponders are connected together. The mechanism is not limited to a 1:1 fault recovery mechanism as in this example, and can be applied without problem to constructions such as 1+1 or N:1. It may also be applied to a scheme where, for example, one of plural intra-site circuits always transmits signals of low priority as a standby circuit. The above two embodiments show only a construction where transmitting and receiving functions are integrated, but the transmitting side and receiving side may be provided separately.

Embodiment 14

Figure 21:
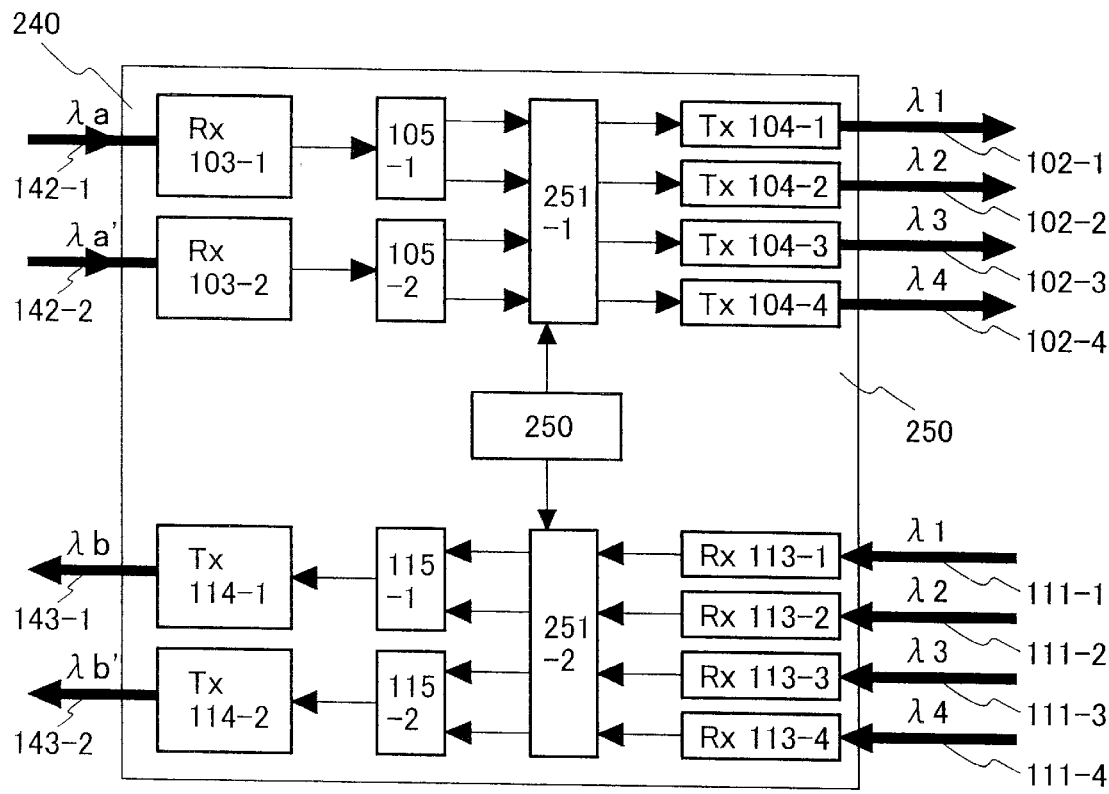
FIG. 21 is a schematic view showing a fourth embodiment of the transponder according to this invention.

FIG. 21 shows yet another embodiment of the transponder according to this invention. In this embodiment, an information signal routing mechanism is built in to the transponders in both the transmitting part and receiving part. There is no particular limitation if it is built into one of the transmitting part and receiving part or on the inter-site interface device side, and routing may be performed in plural devices. According to this embodiment, the speed of the intra-site circuit is approximately twice the speed of the inter-site circuit.

In the transmitting part, signals input from two intra-site side input fibers 142-1, 142-2 are respectively demultiplexed into low speed signals in demultiplexing circuits 105-1, 105-2, and input to a routing module 251-1. The routing module 251-1 sends signals to the inter-site optical transmitters 104-1–104-4 corresponding to destinations based on address information embedded in the packetized information signals and routing information supplied from a routing control circuit 250.

The routing control circuit 250 constantly updates a routing table based on control packet information and device status/fault status/circuit congestion, etc. Likewise, the receiving part routes information signals received from four inter-site optical fiber circuits 111-1–111-4 to desired circuits by a routing module 251-2, multiplexes this information, and outputs it from the intra-site side optical transmitters 114-1, 114-2.

If a routing mechanism is built in, routing efficiency is improved, and the device construction can be made more flexible. Also, a detour route can be set in case of device failure on both the intra-site and inter-site sides, so reliability is improved.

Embodiment 15

Figure 22:
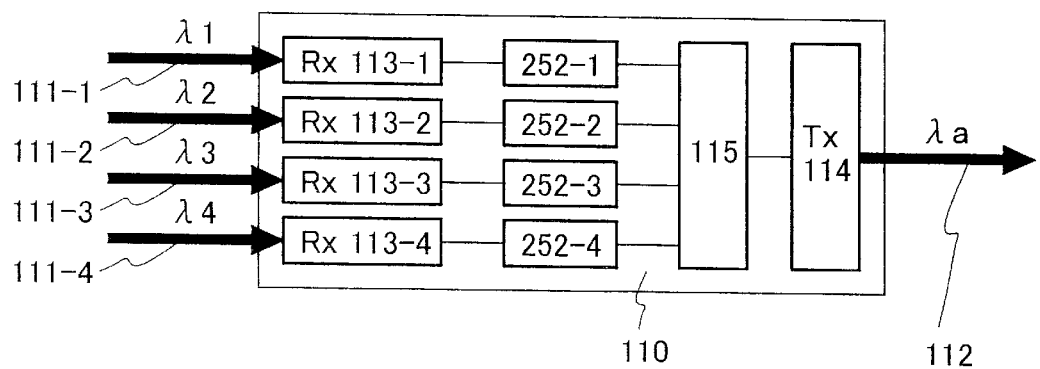
FIG. 22 is a schematic view showing a fifth embodiment of the transponder according to this invent ion.

FIG. 22 is a diagram showing the construction of yet another embodiment of the transponder according to this invention.

In this embodiment, a propagation delay difference compensating circuit 252 in the inter-site circuit is built into the receiving side transponder. It is possible that mutual propagation delay differences may occur between the optical signals received from the inter-site side input optical fibers 111-1–111-4 due to the wavelength dispersion characteristics of the inter-site optical fiber circuit which transmits a wavelength division multiplexed signal, or due to differences in the optical fiber cable length of each circuit before wavelength division multiplexing and after wavelength demultiplexing. There is no problem in treating these as mutually independent circuits, however, the bandwidth of the high-speed intra-site circuit.can be used more effectively if mutual propagation delay differences are eliminated by propagation delay difference compensating circuits 252-1–252-4.

For example, in the case where the inter-site optical fiber circuit is OC-16 (600 Mbit/s), four wavelengths, a signal which uses the full bandwidth of 2.5 Gbit/s such as OC-48 c can.be transmitted through the intra-site circuit, and the range of application of this invention is thereby widened.

The propagation delay difference compensating circuit 252 may employ a variable wavelength delay line or a buffer memory circuit. The propagation delay difference compensating circuit 252 may be installed on the receiving side of the intra-site interface circuit. In this case, the intra-site circuit multiplexes the signal with the propagation delay difference still present, but as the intra-site interface having a propagation delay difference compensating mechanism need only be provided in the information communications device requiring propagation delay difference compensation, it is advantageous from the viewpoints of cost and circuit scale. In principle, this embodiment may be implemented also by installing the propagation delay difference compensating circuit on the transmitting side of the transponder or intra-site interface.

Embodiment 16

Figure 23:
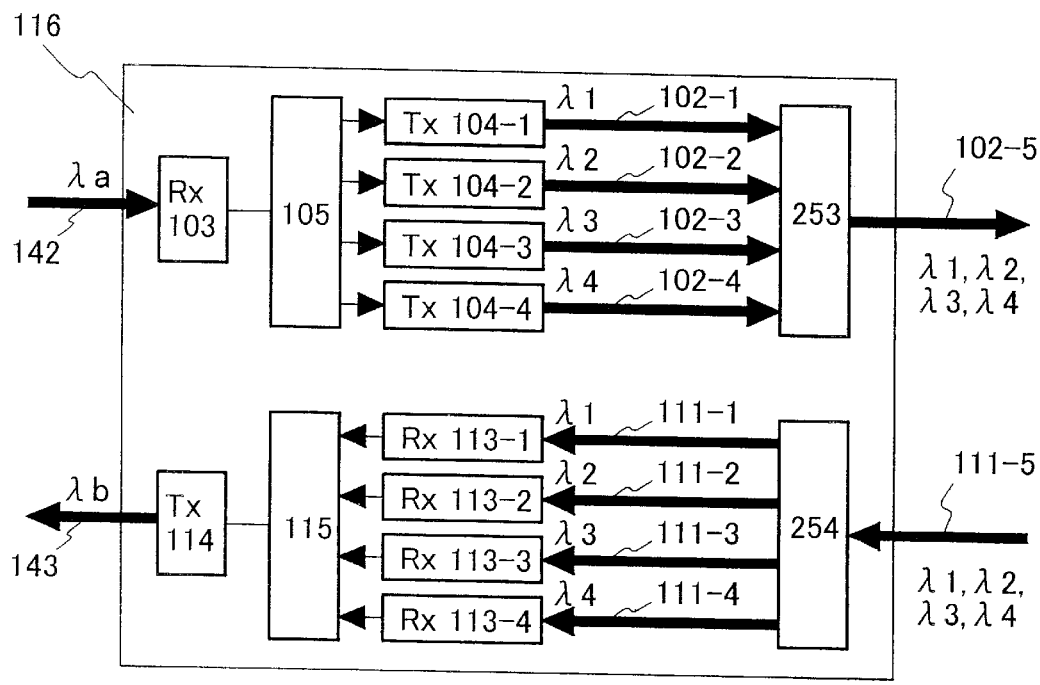
FIG. 23 is a schematic view showing a sixth embodiment of the transponder according to this invention.

FIG. 23 is a schematic view of yet another embodiment of the transponder according to this invention.

According to this embodiment, a wavelength multiplexer and wavelength demultiplexer are built into the transponder.

The output light from the inter-site side optical transmitters 104-1–104-4 is wavelength division multiplexed by an optical multiplexer 253, and output to an inter-site side output optical fiber 102-5. This output light is transmitted without modification, or after wavelength division multiplexing with another optical signal, to another site. Also, a wavelength division multiplexed optical signal input from an inter-site side input light fiber 111-5 is demultiplexed into wavelengths $\lambda1$–$\lambda4$ by an optical demultiplexer 254, which are respectively received by inter-site side optical receivers 113-1–113-4. The optical multiplexer/demultiplexer may also be built in to only one of the transmitting side and receiving side.

If the wavelength multiplexer/demultiplexer 253 and optical demultiplexer 254 are built into the transponder in this way, the number of optical fibers used for inter-device connections is less and the board size can be reduced. Further, by providing a delay difference for each wavelength in the transponder, the aforesaid propagation delay time compensating circuit can be easily implemented.

Embodiment 17

Figure 24:
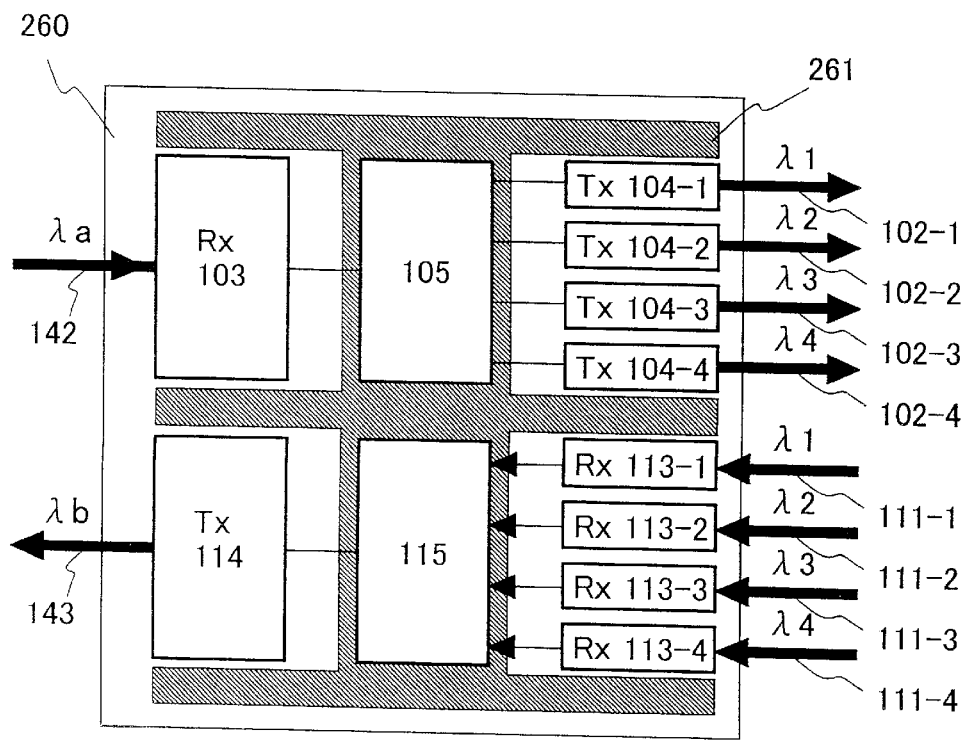
FIG. 24 is a schematic view showing a seventh embodiment of the transponder according to this invention.

FIG. 24 is a schematic view of yet another embodiment of the transponder according to this invention. In this embodiment, all the transmitter/receiver parts of a transponder 260 have a modular construction, and can be individually replaced.

A main frame 261 comprises the multiplexing circuit 105, demultiplexing circuit 115, and other monitoring control circuits or power supply circuits, not shown, and the intra-site side and inter-site side optical transmitters/receivers 102, 113, 104, 114 are all provided as sub-modules or sub-substrates attached to the main frame. According to this construction, maintenance and supervision of transmitting/receiving parts which are particularly prone to faults are easily performed. In particular, in the transponder of this invention, the plural inter-site transmission optical transmitters 104 for wavelength division multiplexing transmission are installed which are fixed at specific wavelengths, so by adopting this construction, the volume of replacement parts required when a fault occurs can be reduced. The modular construction is not limited to the transponder, and can be applied also to the wavelength division multiplexing transmission device, intra-site interface device or intra-site information communications device of this invention, or to the inter-site optical transmitter part, receiver part or multiplexing circuit part so that any desired part can be replaced.

The technical features of the embodiments of the invention may be summarized as follows:

1. An optical transmission me hod as defined in claim 15, wherein the aforesaid first optical signal transmitted at a transmission speed Rb through the aforesaid intra-site circuit is received, demultiplexed into two or more electrical signals by a demultiplexing circuit, two of the signals are converted to the aforesaid second and third signals, and these are wavelength division multiplexed and transmitted to the aforesaid inter-site circuit.
2. An optical transmission method, wherein an optical signal is received from an inter-site circuit in which second and third optical signals of mutually different wavelengths are wavelength division multiplexed and transmitted, the signal is demultiplexed into the original wavelengths, and these are converted a first time sequence optical signal and transmitted to a first intra-site circuit.
3. An optical transmission method as defined in claim 17, wherein the optical signal from the aforesaid inter-site circuit, in which second and third optical signals of mutually different wavelengths are wavelength division multiplexed and transmitted, is demultiplexed into the original wavelengths which are respectively received and converted to electrical signals, multiplexed by a multiplexing circuit, converted to the first time sequence optical signal, and transmitted to the aforesaid first intra-site circuit.
4. An optical transmission method, wherein the optical signal from an inter-site circuit, in which second, third and fourth optical signals of mutually different wavelengths are wavelength division multiplexed and transmitted, is demultipiexed into the original wavelengths, and the aforesaid second and third optical signals are converted to a first time sequence optical signal and transmitted to the first intra-site circuit, whereas the aforesaid fourth optical signal is wavelength converted and transmitted to a second intra-site circuit.
5. An optical transmission method as defined in claim 19, wherein the optical signal from the aforesaid. inter-site circuit, in which second, third and fourth optical signals are wavelength division multiplexed and transmitted, is demultiplexed into the original wavelengths which are respectively received and converted to said second, third and fourth electrical signals, and the aforesaid second and third electrical signals are converted to the aforesaid first time sequence optical signal and transmitted to the first intra-site circuit, whereas the fourth optical signal is wavelength converted and transmitted to the aforesaid second intra-site circuit.
6. An optical transmission method, wherein at least a first optical signal of optical signals transmitted from first and second intra-site circuits at a transmission speed Rb through a first intra-site circuit is received, converted to an electrical signal and demultipleked by a demultiplexing circuit into two or more electrical signals which are respectively converted into second and third optical signals of mutually different wavelengths, an optical signal sent from the second intra-site circuit is received, converted into an electrical signal and then converted into a fourth optical signal of different wavelength to the second and third optical signals, and the aforesaid second, third and fourth optical signals are wavelength division multiplexed and transmitted to an inter-site circuit.

According to the embodiments of the invention, the transmission speed of intra-site transmission can be made much higher than that of the inter-site part, so the number of circuits in the intra-site transmission part can be reduced, costs can be lowered, and maintenance can be performed easily. Further, as the bit rate of the inter-site transmission part can be suppressed low, the transmission distance can be made a long distance.

What is claimed is:

1. A transponder comprising:
    an optical receiver for receiving a high speed optical information signal and for converting the high speed optical information signal to an electrical signal;
    a demultiplexing circuit for separating the electrical signal into a plurality of low speed information signals which are lower in speed than the speed of said high speed optical information signal; and
    a plurality of optical transmitters each of which converts one of said low speed electrical signals into an optical signal of mutually different wavelengths.
2. A transponder comprising:
    a plurality of optical receivers each of which converts one of a plurality of low speed optical information signals having respectively different optical wavelength into an electric signal;
    a multiplexing circuit which multiplexes all of the electric signals from said plurality of optical receivers into a time sequence of a time multiplexed electrical signal; and
    an optical transmitter which converts said time sequence of time multiplexed electrical signal to a high speed optical information signal having a speed higher than a speed of said optical signals having different wavelengths.
3. An optical wavelength multiplex transmission device comprising:

a transponder including an optical receiver for receiving a high speed optical information signal and for converting the high speed optical information signal to an electrical signal, a demultiplexing circuit for separating said electrical signal into a plurality of low speed information signals having a speed lower than the speed of said high speed optical information signal, and a plurality of optical transmitters each of which converts one of said low speed electrical signals into an optical signal of mutually different wavelengths; and an optical multiplexer for multiplexing outputs of said plurality of optical transmitters and for transmission to an inter-site circuit.

4. An optical wavelength multiplex transmission device according to claim 3, further comprising another transponder inputting optical information signals and adding an output thereof to said optical multiplexer.

5. An optical wavelength multiplex transmission device comprising:

an optical demultiplexer which receives a wavelength division multiplexed optical signal having a plurality of optical signals of mutually different wavelengths transmitted from an inter-site circuit and demultiplexes said wavelength division multiplexed optical signal into a plurality of low speed optical information signals having mutually different wavelengths; and a transponder which has a plurality of optical receivers each of which converts each of said plurality of low speed optical information signals respectively into an electric signal, a multiplexing circuit which multiplexes said electric signals from said plurality of optical receivers into a time sequence of a time multiplexed electrical signal, and an optical transmitter which converts said time sequence of time multiplexed electrical signal to a high speed optical information signal having a speed higher than a speed of said optical signals having mutually different wavelengths.

6. An optical wavelength multiplex transmission device according to claim 5 further comprising another transponder inputting one part of said plurality of low speed optical information signals.

7. An optical wavelength multiplex transmission system constructed by a transmitting part having a first wavelength multiplexing transmission device connected to information communication devices through at least one of a plurality of intra-optical fibers, and a receiving part having a second wavelength multiplexing transmission device connected to the first wavelength multiplexing transmission device through an inter-optical fiber, wherein said first wavelength multiplex transmission device comprises:

a first transponder including an a optical receiver receiving a first high speed cptical information signal through a first intra-site transmission line, and converting the first high speed optical information signal to an electrical signal, a demultiplexing circuit for separating said electrical signal to a plurality of low speed information signals having a speed lower than the speed of said high speed optical information signal, and a plurality of optical transmitters each of which converts one of said low speed electrical signals to an optical signal having mutually different wavelengths; and an optical multiplexer which multiplexes outputs of said plurality of optical transmitters to a wavelength division multiplexed optical signal and which transmits the wavelength multiplexed optical signal though said inter-optical fiber.

8. An optical wavelength multiplex transmission system according to claim 7, wherein said first wavelength multiplex transmission device further comprises a transponder which converts a wavelength of an optical information signal transmitted through other intra-optical fibers and adds the output optical information signal thereof to said optical multiplexer.

9. An optical wavelength multiplexing transmission system comprising:

an optical demultiplexer which receives a wavelength division multiplexed optical signal having a plurality of optical signals of mutually different wavelengths transmitted through an inter-optical fiber and which demultiplexes said wavelength division multiplexed optical signal into a plurality of low speed optical information signals having mutually different wavelengths; and a transponder which has a plurality of optical receivers each of which converts each of said plurality of low speed optical information signals to an electric signal, a multiplexing circuit which multiplexes electric signals from said plurality of optical receivers into a time sequence of a time multiplexed electrical signal, and an optical transmitter which converts said time sequence of time multiplexed electrical signal to a high speed optical information signal having a speed higher than a speed of said optical signals having mutually different wavelengths.

10. An optical wavelength multiplex transmission system according to claim 9, wherein said second wavelength multiplex transmission device further comprises another transponder which converts a wavelength of an optical information signal from said cptical demultiplexer and adds the output optical information signal thereof to intra-optical fibers.

11. An optical wavelength multiplexing transmission device comprising:

an optical demultiplexer which demultiplexes a wavelength division multiplexed optical signal from an inter-site optical fiber to a first plurality of individual wavelength components;

a first transponder which has a plurality of optical receivers each of which converts each of said first plurality of individual wavelength components to an electric signal, a multiplexing circuit which multiplexes said electric signals into a time sequence of a time multiplexed electrical signal, and a transmitter which transmits said time sequence of a time multiplex electrical signal to a first intra-site circuit; and a second transponder which has a first means for receiving said time sequence of time multiplexed electrical signal from said first transponder, a second means for converting said time sequence of time multiplexed electrical signal to a plurality of electrical signals, and a plurality of optical transmitters each of which converts each of said plurality of electrical signals to an optical signal having mutually different wavelengths; and an optical multiplexer which multiplexes said optical signals and effects transmission to an inter-site circuit.

12. An optical wavelength multiplexing transmission device according to claim 11, wherein said first intra-site circuit is an information communication device.

13. An information communication device having an output part outputting a plurality of first parallel information signals, an input part inputting a plurality of second parallel information signals, and an interface device, wherein said interface device has a first connecting part connecting said input part and an output optical fiber through a first transponder and a second connecting part connecting said input part and an input optical fiber, through a second transponder;

said first transponder having a multiplexing circuit which multiplexes said plurality of first parallel information signals to a time sequence of a time multiplexed electric signal, and an, optical transmitter which converts the output of said multiplexing circuit to an optical signal and adds said optical signal to said output optical fiber;

said second transponder having a optical receivers which receive an optical signal from said input optical fiber and converts to an electric signal, a separating circuit which separates said electric signal into a plurality of low speed signals; and said first connecting part includes an information adding means for adding fault monitoring signals to said plurality of second parallel information signals, said second connecting part including an information detecting means for detecting fault monitoring signals from outputs of said second transponder.

14. An information communication device having an output part outputting a plurality of first parallel information signals, an input part inputting a plurality of second parallel information signals, and an interface device, wherein said interface device has a first connecting part connecting said input part and an output optical fiber through a first transponder and a second connecting part connecting said input part and an input optical fiber, through a second transponder;

said first transponder having a multiplexing circuit which multiplexes said plurality of first parallel information signals to a time sequence of a time multiplexed electric signal, and an optical transmitter which converts the output of said multiplexing circuit to an optical signal and adds said optical signal to said output optical fiber;

said second transponder having optical receivers receiving an optical signal from said input optical fiber and converting the optical signal to an electric signal, a separating circuit which separates said electric signal into a plurality of low speed signals; and said first connecting part includes an information adding means for adding error correcting signals to said plurality of second parallel information signals, said second connecting part including an information detecting means for detecting the error correcting signals from outputs of said second transponder.

* * * * *